(12) United States Patent
Xue et al.

(10) Patent No.: US 12,506,825 B2
(45) Date of Patent: Dec. 23, 2025

(54) ELECTRONIC DEVICE

(71) Applicant: HONOR DEVICE CO., LTD., Guangdong (CN)

(72) Inventors: Kangle Xue, Shenzhen (CN); Jiuliang Gao, Shenzhen (CN); Weirong Su, Shenzhen (CN); Bin Yan, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 64 days.

(21) Appl. No.: 18/041,644

(22) PCT Filed: Sep. 14, 2022

(86) PCT No.: PCT/CN2022/118791
§ 371 (c)(1),
(2) Date: Feb. 14, 2023

(87) PCT Pub. No.: WO2023/061138
PCT Pub. Date: Apr. 20, 2023

(65) Prior Publication Data
US 2025/0039287 A1    Jan. 30, 2025

(30) Foreign Application Priority Data

Oct. 12, 2021 (CN) .......................... 202111185318.8

(51) Int. Cl.
*H04M 1/02* (2006.01)
*H04N 23/54* (2023.01)
(Continued)

(52) U.S. Cl.
CPC .......... *H04M 1/0264* (2013.01); *H04N 23/54* (2023.01); *H04N 23/55* (2023.01); *H04N 23/57* (2023.01)

(58) Field of Classification Search
CPC ........ Y02N 20/40; G03B 30/00; G03B 17/02; H04N 23/57; H04N 23/55; H04N 23/54; H04M 1/0264
See application file for complete search history.

(56) References Cited

U.S. PATENT DOCUMENTS

2020/0174274 A1    6/2020  Wang et al.
2022/0365360 A1*  11/2022  Uchida ................ H04N 23/957

FOREIGN PATENT DOCUMENTS

CN    106852105 A    6/2017
CN    108234850 A    6/2018
(Continued)

*Primary Examiner* — Xi Wang
(74) *Attorney, Agent, or Firm* — Fish & Richardson P.C.

(57) ABSTRACT

This application provides an electronic device. An opening is disposed on a support plate of a middle frame, and a camera module is mounted corresponding to the opening. At least a part of the thickness of the dimming conversion assembly of the camera module extends into the opening, the part of the thickness of the dimming conversion assembly does not occupy a mounting space between the middle frame and a rear cover (a display panel), and a thickness of the whole machine can be reduced, thereby facilitating lightening and thinning of the electronic device. The inner concave portion is disposed on at least a part of an area of a circumferential edge of the dimming conversion assembly, and the edge of the inner concave portion contracts in the edge of the lens assembly.

20 Claims, 13 Drawing Sheets

(51) Int. Cl.
*H04N 23/55* (2023.01)
*H04N 23/57* (2023.01)

(56) References Cited

FOREIGN PATENT DOCUMENTS

| | | | |
|---|---|---|---|
| CN | 208112675 | U | 11/2018 |
| CN | 108966551 | A | 12/2018 |
| CN | 109600535 | A | 4/2019 |
| CN | 110365885 | A | 10/2019 |
| CN | 111182185 | A | 5/2020 |
| CN | 210670265 | U | 6/2020 |
| CN | 212115439 | U | 12/2020 |
| CN | 212542666 | U | 2/2021 |
| CN | 112492129 | A | 3/2021 |
| CN | 213244069 | U | 5/2021 |
| CN | 214151540 | U | 9/2021 |
| CN | 113472978 | A | 10/2021 |
| CN | 113489886 | A | 10/2021 |
| KR | 20150088044 | A | 7/2015 |

\* cited by examiner

ELECTRONIC DEVICE

CROSS-REFERENCE TO RELATED APPLICATIONS

This application is a national stage of International Application No. PCT/CN2022/118791, filed on Sep. 14, 2022, which claims priority to Chinese Patent application Ser. No. 202111185318.8, filed on Oct. 12, 2021. The disclosures of both of the aforementioned applications are hereby incorporated by reference in their entireties.

TECHNICAL FIELD

This application relates to the field of terminal device technologies, and in particular, to an electronic device.

BACKGROUND

With development of science and technology, not only a higher requirement is put forward for functions of an electronic device such as a mobile phone or a tablet computer, but also an appearance of the electronic device is developing in a lightening and thinning direction.

Using the mobile phone as an example, a camera module of the mobile phone is usually mounted on a middle frame. The camera module includes a lens assembly, and a light filtering assembly, and a photosensitive chip assembly that are sequentially mounted on an out-light side of the lens assembly. To reduce a thickness of a whole machine, an avoidance opening is usually disposed on the middle frame. Using a front camera as an example, in the camera module, the lens assembly mainly occupies a mounting space between the middle frame and a screen, the photosensitive chip assembly and a part of the thickness of the light filtering assembly extend into the avoidance opening, to reduce a thickness space of the whole machine that is occupied by the camera module.

However, as a plane size of the camera module gradually increases, an area of the avoidance opening disposed on the middle frame gradually increases, and consequently, strength of the middle frame is reduced.

SUMMARY

This application provides an electronic device. A space occupied by a camera module of the electronic device is small. This reduces impact of mounting of the camera module on a middle frame while ensuring lightening and thinning of a whole machine, thereby improving strength of the middle frame.

This application provides an electronic device, including a middle frame and a camera module, where the middle frame includes a frame portion and a support plate connected to the frame portion, an opening is disposed on the support plate, and the camera module is mounted on the middle frame and corresponds to the opening;

the camera module includes a lens assembly and a dimming conversion assembly, the dimming conversion assembly is disposed on an out-light side of the lens assembly, and the dimming conversion assembly extends into the opening; at least a part of a circumferential area of an edge of the dimming conversion assembly includes an inner concave portion, and an edge of the inner concave portion is located on an inner side of an edge of the lens assembly; and the inner concave portion is located on a side that is of the dimming conversion assembly and that is away from the lens assembly, and the inner concave portion occupies at least a part of the thickness of the dimming conversion assembly; and an avoidance space is formed between the edge of the inner concave portion and the edge of the lens assembly, an inner edge of the opening includes a reinforcing portion, and the reinforcing portion extends into the avoidance space.

According to the electronic device provided in this application, the opening is disposed on the support plate of the middle frame, and the camera module is mounted corresponding to the opening. At least a part of the thickness of the dimming conversion assembly of the camera module extends into the opening, the part of the thickness of the dimming conversion assembly does not occupy a mounting space between the middle frame and a rear cover (a display panel), and a thickness of the whole machine can be reduced, thereby facilitating lightening and thinning of the electronic device. The inner concave portion is disposed on at least a part of an area of a circumferential edge of the dimming conversion assembly, and the edge of the inner concave portion contracts in the edge of the lens assembly. An avoidance space is formed between the edge of the inner concave portion and the edge of the lens assembly. A reinforcing portion is disposed on a part that is of an inner edge of the opening and that corresponds to the inner concave portion, and the reinforcing portion extends into the avoidance space, to reduce an area of an opening area enclosed by the opening, increase a coverage area of the support plate, improve structural strength of the middle frame, and improve reliability of the camera module and the electronic device In a possible implementation, the dimming conversion assembly includes a light filtering assembly and an image sensor assembly, the light filtering assembly and the image sensor assembly are sequentially stacked on the out-light side of the lens assembly, and both the image sensor assembly and the light filtering assembly extend into the opening; and the inner concave portion is disposed at least on the image sensor assembly.

The light filtering assembly is mounted on the out-light side of the lens assembly, and the image sensor assembly is connected to a side that is of the light filtering assembly and that is away from the lens assembly. The inner concave portion is disposed at least on the image sensor assembly, so that the reinforcing portion that extends from the inner edge of the opening on the support plate is at least correspondingly located outside a peripheral side of the image sensor assembly, to ensure that the dimming conversion assembly can extend into an opening area enclosed by the reinforcing portion.

In a possible implementation, an edge of the light filtering assembly is flush with the edge of the lens assembly, and at least a part of a circumferential area of an edge of the image sensor assembly includes the inner concave portion; and the reinforcing portion includes a step portion connected to the inner edge of the opening, and in a thickness direction of the support plate, the step portion is located on a part that is of the support plate and that is away from the lens assembly.

The edge of the support frame of the light filtering assembly is flush with the edge of the lens assembly. The inner concave portion is disposed on an edge of a substrate of the image sensor assembly, and the avoidance space is formed between an edge of the inner concave portion of the substrate and the edge of the lens assembly. In the thickness direction of the support plate, a part that is of the inner edge of the opening and that corresponds to the support frame is located on an outer side of a side wall of the lens assembly, and a part that is of the inner edge of the opening and that corresponds to the inner concave portion of the substrate extends inward to form a step portion, and the step portion extends into the avoidance space to form the reinforcing portion.

In a possible implementation, at least a part of a circumferential area of an edge of the image sensor assembly includes a first inner concave portion, at least a part of a circumferential area of an edge of the light filtering assembly includes a second inner concave portion, the second inner concave portion corresponds to the first inner concave portion, and the first inner concave portion and the second inner concave portion jointly constitute the inner concave portion; and a first avoidance space is formed between an edge of the first inner concave portion and the edge of the lens assembly, a second avoidance space is formed between an edge of the second inner concave portion and the edge of the lens assembly, and the reinforcing portion extends into the first avoidance space and the second avoidance space.

The first inner concave portion is disposed on a circumferential edge of a substrate of the image sensor assembly, the second inner concave portion is disposed on the circumferential edge of the support frame of the light filtering assembly, the first inner concave portion and the second inner concave portion jointly constitute the inner concave portion, the first avoidance space is formed between the edge of the first inner concave portion and the edge of the lens assembly, and the second avoidance space is formed between the edge of the second inner concave portion and the edge of the lens assembly. In this way, the reinforcing portion that extends from the inner edge of the opening on the support plate may include a part that extends into the first avoidance space and a part that extends into the second avoidance space. This can increase a thickness of the reinforcing portion and improve structural strength of the support plate. The second inner concave portion should correspond to the first inner concave portion, so that the first inner concave portion can pass through an opening area enclosed by a part that is of the reinforcing portion and that corresponds to the second inner concave portion, and extend into an opening area enclosed by a part that is of the reinforcing portion and that corresponds to the first inner concave portion.

In a possible implementation, an orthographic projection of the image sensor assembly on the light filtering assembly completely covers the light filtering assembly, surfaces on two sides of the reinforcing portion are respectively flush with surfaces on two sides of the support plate, and end surfaces that are of the reinforcing portion and that face a side wall of the dimming conversion assembly are flush.

The edge of the second inner concave portion is flush with the edge of the first inner concave portion, or the edge of the second inner concave portion contracts in the edge of the first inner concave portion, so that a projection of the image sensor assembly on the light filtering assembly completely covers the light filtering assembly, and a cross-sectional area of the second avoidance space is larger than or equal to a cross-sectional area of the first avoidance space. Because the substrate of the image sensor assembly needs to pass through an opening area enclosed by a part that is of the reinforcing portion and that extends into the second avoidance space, the inner edge of the opening may integrally extend inward in a thickness direction of the substrate, to form the reinforcing portion. This can increase a thickness of the reinforcing portion and improve structural strength of the support plate. In addition, a length of a part that is of the reinforcing portion and that extends into the second avoidance space is the same as a length of a part that is of the reinforcing portion and that extends into the first avoidance space, and end surfaces that are of the reinforcing portion and that face the dimming conversion assembly are flush.

In a possible implementation, the edge of the first inner concave portion is located on an inner side of the edge of the second inner concave portion, the reinforcing portion includes a first reinforcing portion and a second reinforcing portion, the first reinforcing portion extends into the first avoidance space and is located on a part that is of the support plate and that is away from the lens assembly, and the second reinforcing portion extends into the second avoidance space and is located on a part that is of the support plate and that is close to the lens assembly; and an extension length of the first reinforcing portion is greater than an extension length of the second reinforcing portion, and the first reinforcing portion includes a step surface facing the light filtering assembly.

The first inner concave portion contracts in the second inner concave portion, and the edge of the first inner concave portion is located on the inner side of the edge of the second inner concave portion. A cross-sectional area of the first avoidance space is larger than a cross-sectional area of the second avoidance space. Correspondingly, the reinforcing portion includes the first reinforcing portion that extends into the first avoidance space and the second reinforcing portion that extends into the second avoidance space. An extension length of the first reinforcing portion is greater than an extension length of the second reinforcing portion, an end portion of the first reinforcing portion extends to the outside of the second reinforcing portion, and a step surface facing the light filtering assembly is formed between the first reinforcing portion and the second reinforcing portion. In this way, an extension length of the reinforcing portion is increased, an area of the opening is reduced, and structural strength of the support plate is improved.

In a possible implementation, the inner concave portion covers at least one side of the dimming conversion assembly.

The inner concave portion is disposed on the at least one side of the dimming conversion assembly, and the inner concave portion extends to a whole area that covers the side. In this way, the reinforcing portion formed on the inner edge of the opening may cover the whole area of an inner wall of the corresponding side of the opening This can increase a coverage area of the reinforcing portion, reduce an opening area of the opening, and improve structural strength of the support plate.

In a possible implementation, the inner concave portion covers sides of at least two opposite sides of the dimming conversion assembly.

In a possible implementation, the inner concave portion is a ring-shaped structure disposed along a circumferential edge of the dimming conversion assembly.

In a possible implementation, the inner concave portion is disposed corresponding to a corner portion of the dimming conversion assembly, and at least one corner portion of the dimming conversion assembly is provided with the inner concave portion.

The inner concave portion is disposed at the corner portion of the dimming conversion assembly, and correspondingly, a corner portion of the inner edge of the opening on the support plate extends inward to form a reinforcing portion, to reduce an area of the opening, increase a coverage area of the support plate, and enhance structural strength of the support plate.

In a possible implementation, the camera module further includes a protective cover, the protective cover wraps side walls of the dimming conversion assembly and the lens assembly, the protective cover includes a recessed portion, and the recessed portion corresponds to the inner concave portion.

The protective cover is wrapped outside the side walls of the dimming conversion assembly and the lens assembly, so that the protective cover can improve a sealing property of the camera module, prevent foreign matter in an external environment from entering the dimming conversion assembly, and protect performance of the dimming conversion assembly. The recessed portion is disposed on a part of that is of the protective cover and that corresponds to the inner concave portion of the dimming conversion assembly, so that the recessed portion can provide a space for the reinforcing portion of the inner edge of the opening, and then the protective cover passes through the opening area enclosed by the reinforcing portion.

In a possible implementation, the protective cover is connected to the middle frame.

The protective cover is connected to the middle frame, so that the camera module is mounted on the middle frame.

In a possible implementation, the camera module further includes a bracket, the bracket is sleeved onto the side wall of the lens assembly, and the bracket is connected to the middle frame.

The bracket is sleeved onto the side wall of the lens assembly, and the bracket is fixedly connected to the middle frame, so that the camera module is mounted on the middle frame by using the bracket. The bracket may be directly sleeved onto the side wall of the lens assembly, or the bracket is sleeved outside the protective cover wrapped outside the side wall of the lens assembly.

In a possible implementation, the image sensor assembly includes a substrate and an image sensor disposed on the substrate, and the light filtering assembly includes a support frame and a light filter mounted on the support frame; and
    the inner concave portion is disposed on the substrate, or
        the inner concave portion is disposed on the substrate and the support frame.

An outer edge of the image sensor assembly is an outer edge of the substrate, an outer edge of the light filtering assembly is an outer edge of the support frame, and the substrate is located on a side that is of the support frame and that is away from the lens assembly. The inner concave portion is disposed on the edge of the substrate, or the inner concave portion is disposed on the edge of the substrate and the edge of the support frame, to form an avoidance space between the edge of the dimming conversion assembly and the edge of the lens assembly, and the dimming conversion assembly can extend into an opening area formed by the reinforcing portion of the inner edge of the opening on the support plate.

In a possible implementation, the image sensor assembly further includes a flexible printed circuit, one end of the flexible printed circuit is connected to the substrate, and the other end of the flexible printed circuit is connected to an external circuit.

In a possible implementation, the flexible printed circuit includes a connection segment located on an outer side of a side wall of the lens assembly, one side that is of the connection segment and that faces one side of the support plate is a first side of the flexible printed circuit, and a spacing between at least a part of the segment of the first side and the support plate is greater than or equal to a spacing between the lens assembly and the support plate.

The FPC extends from one end connected to the substrate along the side wall of the lens assembly, and extends to the outside of the camera module. The FPC includes a connection segment that is located outside the side wall of the lens assembly and that extends along the side wall of the lens assembly. One side that is of the connection segment of the FPC and that faces the support plate is a first side of the FPC. A spacing between at least a part of the segment of the first side of the FPC and the support plate is greater than a spacing between the lens assembly and the support plate, and a spacing between at least a part of the segment of the connection segment and the support plate is greater than or equal to a spacing between the lens assembly and the support plate, so that the connection segment increases a spacing between the inner concave portion of the edge of the dimming conversion assembly and the FPC that is located on an outer side of the lens assembly, and then the connection segment provides a space for the reinforcing portion of the edge of the opening on the support plate to extend. In this way, an extension length of the reinforcing portion is increased, an area of an opening area enclosed by the reinforcing portion is reduced, a coverage area of the support plate is increased, and structural strength of the middle frame is improved.

In a possible implementation, the flexible printed circuit extends along an axial direction of the lens assembly from a side that is the flexible printed circuit and that is connected to the substrate, and extends from a side that is of the lens assembly and that is away from the image sensor assembly; and the connection segment is a part that is of the flexible printed circuit and that extends along an axial direction of the lens assembly The connection segment of the FPC extends along the connection side between the FPC and the substrate, the connection segment of the FPC corresponds to a corresponding side of the lens assembly, and the FPC on an outer side of the corresponding side of the lens assembly can provide an extra space, to increase a spacing between an outer edge of the inner concave portion of a corresponding side of the dimming conversion assembly and the connection segment of the FPC, and then increase an extension length of the reinforcing portion at a corresponding part of the inner edge of the opening on the support plate.

In a possible implementation, the flexible printed circuit extends circumferentially around the side wall of the lens assembly from a side that is of the flexible printed circuit and that is connected to the substrate, and extends from a side that is of the lens assembly and that is away from the image sensor assembly; and the connection segment is a part that is of the flexible printed circuit and that extends around the side wall of the lens assembly.

After the FPC extends from a corresponding side that is connected to the substrate, the FPC extends circumferentially around an outer side wall of the lens assembly, so that at least two sides of the outer side wall of the lens assembly include connection segments of the FPC. Both connection segments of the FPC located on the outer side of the corresponding side of the lens assembly can provide an extra space, to increase a spacing between an outer edge of the inner concave portion of a corresponding side of the dimming conversion assembly and the connection segment of the FPC, and then increase an extension length of a reinforcing portion at a corresponding part of the inner edge of the opening on the support plate.

In a possible implementation, the lens assembly includes a lens barrel and a plurality of lenses disposed in the lens barrel, the plurality of lenses are stacked along an axial direction of the lens barrel, and the dimming conversion assembly is connected to the lens barrel.

The camera module may be a fixed-focus module. The lens assembly of the fixed-focus module includes a lens barrel and a lens that is packaged in the lens barrel. The dimming conversion assembly may be bonded to an out-light side of the lens barrel.

In a possible implementation, the lens assembly includes a lens and a drive apparatus. the drive apparatus includes a housing, the lens is movably disposed in the housing, and the dimming conversion assembly is connected to the housing.

The camera module may be an autofocus module, and the lens assembly of the autofocus module includes a drive apparatus and a lens. The lens assembly is disposed in the housing of the drive apparatus, the drive apparatus drives the lens to move, and the dimming conversion module is connected to an outer surface of the housing of the drive apparatus.

DESCRIPTION OF REFERENCE NUMERALS

1—Camera module; 2—Middle frame; 3—Rear cover; 4—Display panel; 5—Circuit board;
11—Lens assembly; 12—Light filtering assembly; 13—Image sensor assembly; 14—Inner concave portion; 15—Protective cover; 16—Bracket 21—Support plate; 22—Frame portion; 31—Light—transmitting hole;
111—Lens; 112—Drive apparatus; 121—Support frame; 122—Light filter; 131—Substrate; 132—Image sensor; 133—FPC; 134—Electrical connector; 141—First inner concave portion; 142—Second inner concave portion; 151—Recessed portion; 211—Opening; 212—Reinforcing portion;
1121—Housing; 1331—Connection segment; 2121—First reinforcing portion; 2122—Second reinforcing portion; 212a—Step portion;
1331a—First side; 2121a—Step surface.

DESCRIPTION OF EMBODIMENTS

Terms used in implementations of this application are only used to explain specific embodiments of this application, and are not intended to limit this application.

With continuous progress of science and technology, a photographing function has gradually become a basic configuration of a terminal device such as a mobile phone, a tablet computer, a notebook computer, an ultra-mobile personal computer (ultra-mobile personal computer. UMPC), a netbook, a personal digital assistant (Personal Digital Assistant, PDA), a smart wearable device, a point of sales terminal (Point of Sales. POS), a vehicle-mounted device, or an augmented reality (augmented reality. AR)/a virtual reality (virtual reality, VR) device.

Figure 1:
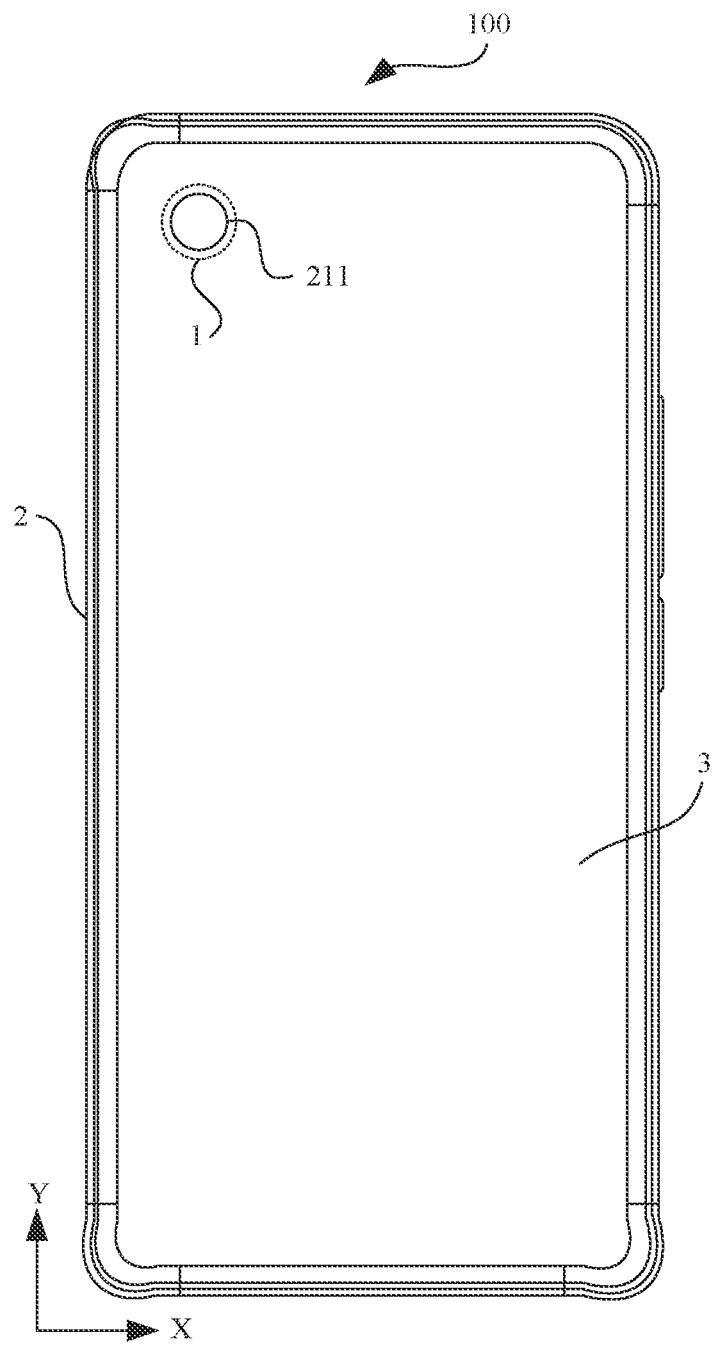
FIG. 1 is a schematic diagram of a structure of an electronic device according to an embodiment of this application.
Figure 2:
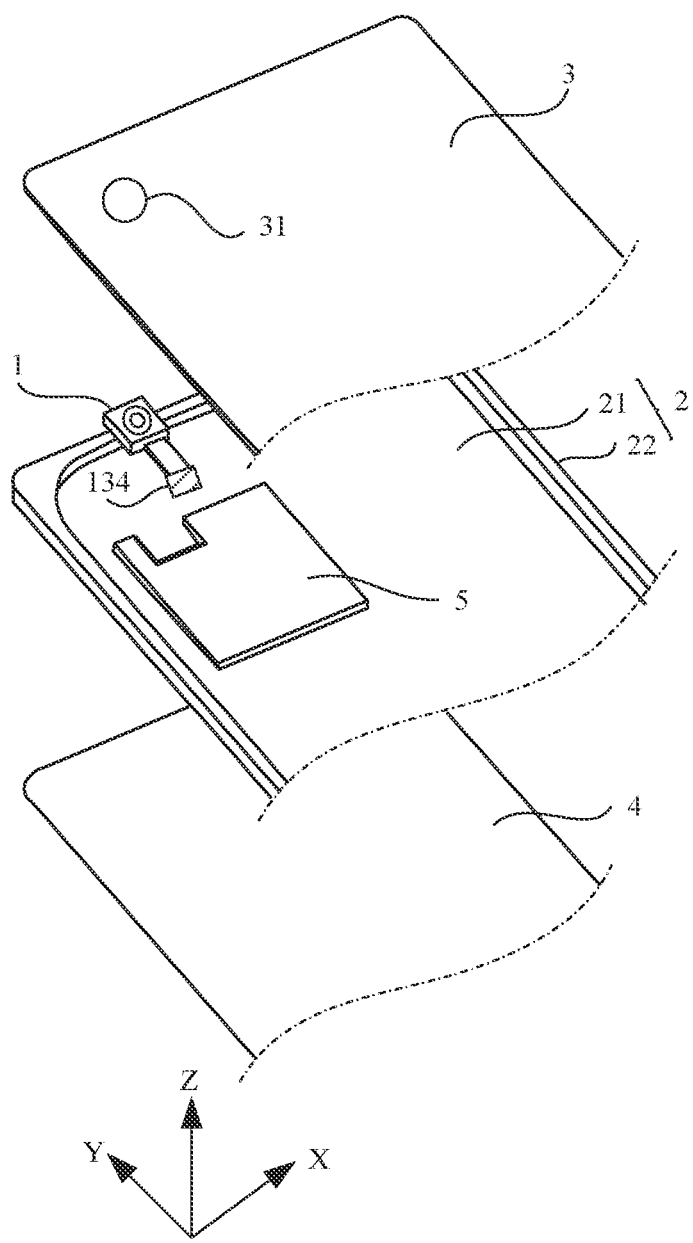
FIG. 2 is a partial exploded view of FIG. 1.

FIG. 1 is a schematic diagram of a structure of an electronic device according to an embodiment of this application; and FIG. 2 is a partial exploded view of FIG. 1. Referring to FIG. 1 and FIG. 2, a mobile phone is used as an example to describe an electronic device 100 in this application. It should be understood that the electronic device 100 in this embodiment includes, but is not limited to, a mobile phone. The electronic device 100 may alternatively be a terminal device such as the foregoing tablet computer, notebook computer, UMPC, netbook, PDA, POS, vehicle-mounted device, or AR/VR device.

Referring to FIG. 1 and FIG. 2, the electronic device 100 may include a housing, a display panel 4, a camera module 1, and a circuit board 5. The housing is disposed around a rear surface and a side surface of the electronic device 100, and the display panel 4 is mounted on the housing. The display panel 4 and the housing are jointly enclosed into an accommodating space of the electronic device 100, and both the camera module 1 and the circuit board 5 are mounted in the accommodating space. In addition, components such as a microphone, a speaker, and a battery may be further disposed in the accommodating space.

With reference to FIG. 1, FIG. 1 shows that the camera module 1 is located in an area that is at a top of the housing and near an edge. It can be understood that a position that is of the camera module 1 and that is not limited to the position shown in FIG. 1.

Referring to FIG. 2, the housing may include a rear cover 3 and a middle frame 2, and the camera module 1 may be disposed on the middle frame 2. A light-transmitting hole 31 is disposed on the rear cover 3. In an example in which the camera module 1 is a rear camera, the camera module 1 collects external ambient light through the light-transmitting hole 31 on the rear cover 3. An in-light surface of the camera module 1 and the light-transmitting hole 31 are disposed opposite to each other, and the external ambient light passes through the light-transmitting hole 31 and irradiates to the in-light surface of the camera module 1. The in-light surface of the camera module 1 is configured to collect the external ambient light, and the camera module 1 is configured to convert a light signal into an electrical signal, to implement a photographing function of the camera module 1.

The camera module 1 may alternatively be a front camera. In this case, the in-light surface of the camera module 1 faces the display panel 4, a part that is of the display panel 4 and that faces the in-light surface of the camera module 1 includes a light-transmitting portion (not shown), and the external ambient light irradiates to the in-light surface of the camera module 1 through the light-transmitting portion of the display panel 4. Details are not described again.

FIG. 2 shows that a camera module 1 is disposed in the electronic device 100. It should be noted that, in an actual application, a quantity of camera modules 1 is not limited to one, and there may be two or more camera modules 1. When there are a plurality of camera modules 1, the plurality of camera modules 1 may be randomly arranged in an X-Y plane. For example, the plurality of camera modules 1 are arranged along an X-axis direction, or the plurality of camera modules 1 are arranged along a Y-axis direction.

In addition, the camera module 1 includes, but is not limited to, an autofocus (Auto Focus, AF) module, a fixed-focus (Fixed Focus, FF) module, a wide-angle camera module, a long-focus camera module, a color camera module, or a greyscale digital camera module. The camera module 1 in the electronic device 100 may include any one of the foregoing camera modules 1, or include two or more of the foregoing camera modules 1. When there are two or more camera modules 1, the two or more camera modules 1 may be integrated into one camera assembly.

Referring to FIG. 2, the camera module 1 may be electrically connected to the circuit board 5, for example, the circuit board 5 is a mainboard in the electronic device 100. In an implementation, the camera module 1 may be electrically connected to the mainboard by using an electrical connector 134, for example, the camera module 1 is provided with a female socket of the electrical connector 134, and the mainboard is provided with a male socket of the electrical connector 134. The female socket is inserted into the male socket, to implement an electrical connection between the camera module 1 and the mainboard. A processor may be disposed on the mainboard, and the camera module 1 is controlled to photograph an image by using the processor. When a user inputs a photographing instruction, the processor receives the photographing instruction, and controls the camera module 1 to photograph the photographed object according to the photographing instruction.

In an actual application, the camera module 1 is usually mounted and disposed by using a thickness direction of the electronic device 100 as a light axis direction of the camera module 1, and a mounting space is provided for the camera module 1 in the thickness direction of the electronic device 100. In an example in which the camera module 1 is a rear camera, in the electronic device 100, the camera module 1 is located in a space between the middle frame 2 and the rear cover 3. In an example in which the camera module 1 is a front camera, in the electronic device 100, the camera module 1 is located in a space between the middle frame 2 and the display panel 4.

Figure 3:
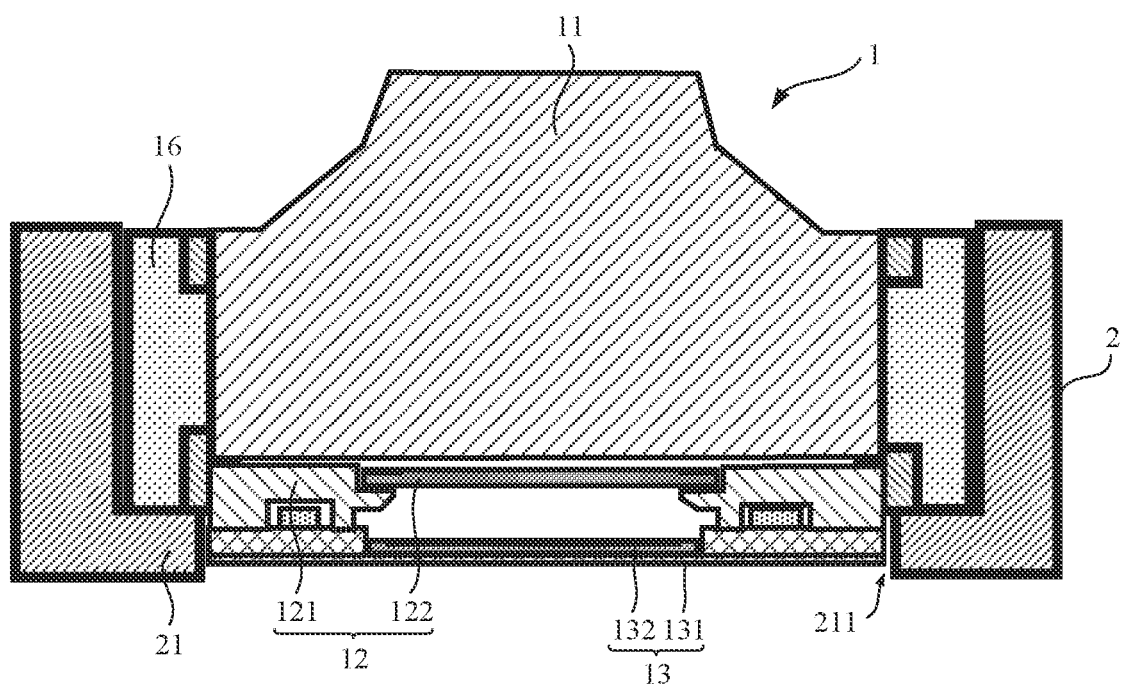
FIG. 3 is a schematic diagram of a mounting structure of a camera module in a related technology.

FIG. 3 is a schematic diagram of a mounting structure of a camera module in a related technology. Referring to FIG. 3, the camera module 1 usually includes a lens assembly 11, a light filtering assembly 12, and an image sensor assembly 13. The light filtering assembly 12 and the image sensor assembly 13 are sequentially stacked on an out-light side of the lens assembly 11. The image sensor assembly 13 faces the middle frame 2, and the lens assembly 11 faces the rear cover 3 or the display panel 4. The camera module 1 may further include a bracket 16, and the bracket 16 is sleeved onto an outer side wall of the lens assembly 11, the bracket 16 is fixedly connected to the middle frame 2, and the camera module 1 is mounted on the middle frame 2 by using the bracket 16.

To reduce a mounting space occupied by the camera module 1, an opening 211 is disposed on the middle frame 2, so that the image sensor assembly 13 and a part of the thickness of the light filtering assembly 12 extend into the opening 211. A space between the middle frame 2 and the rear cover 3 (the display panel 4) is mainly used for disposing the lens assembly 11. In this way, a thickness space of a whole machine occupied by the camera module 1 is reduced, and further, a thickness of the whole machine can be reduced, thereby facilitating lightening and thinning of the electronic device 100.

In addition, to improve performance of the camera module 1, a plane size of the camera module 1 gradually increases, that is, a cross-sectional area that is of the camera module 1 and that is perpendicular to a light axis direction increases. With reference to FIG. 3, for matching the lens assembly 11, plane sizes of the light filtering assembly 12 and the image sensor assembly 13 increase synchronously. In this way, a size of the opening 211 disposed on the middle frame 2 also gradually increases.

However, as the size of the opening 211 on the middle frame 2 increases, structural strength of the middle frame 2 is reduced. The structural strength of the middle frame 2 affects mounting performance of the camera module 1, reduces reliability of the camera module 1, and then affects reliability of the electronic device 100.

In view of this, according to the electronic device provided in this embodiment of this application, an inner concave portion is disposed on an edge of the dimming conversion assembly in the camera module, so that at least a part of an edge area that is of the dimming conversion assembly and that faces the middle frame contracts in the lens assembly, and an avoidance space is formed between an edge of the inner concave portion and an edge of the lens assembly. Therefore, an inner edge of the opening disposed on the middle frame may include a reinforcing portion that extends into the avoidance space. In this way, the thickness space occupied by the camera module is reduced, a size of the opening disposed on the middle frame can be reduced, and structural strength of the middle frame may be improved, thereby ensuring reliability of the camera module.

Figure 4:
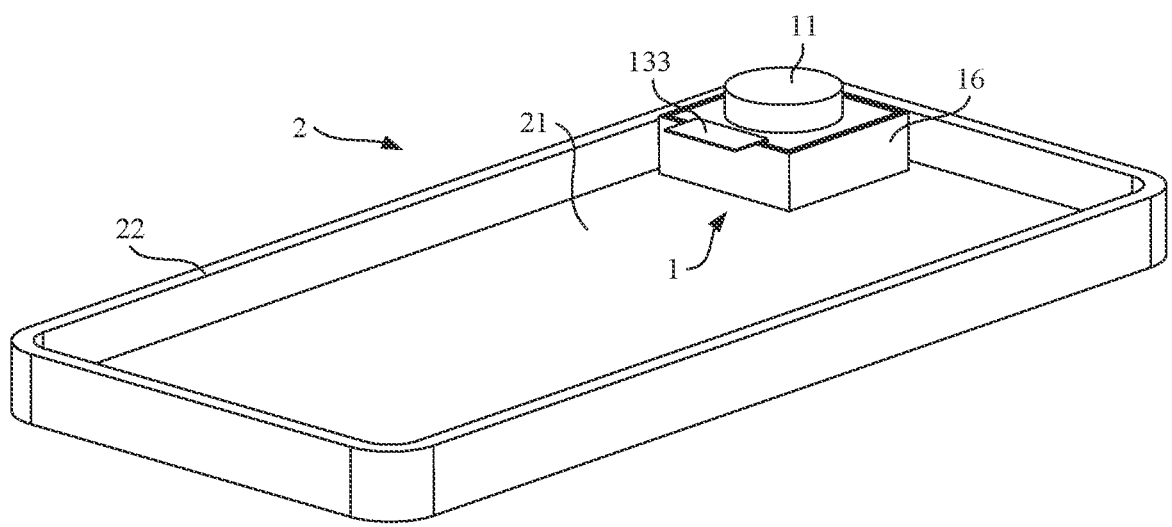
FIG. 4 is a schematic diagram of a structure of a camera module mounted on a middle frame according to an embodiment of this application.
Figure 5:
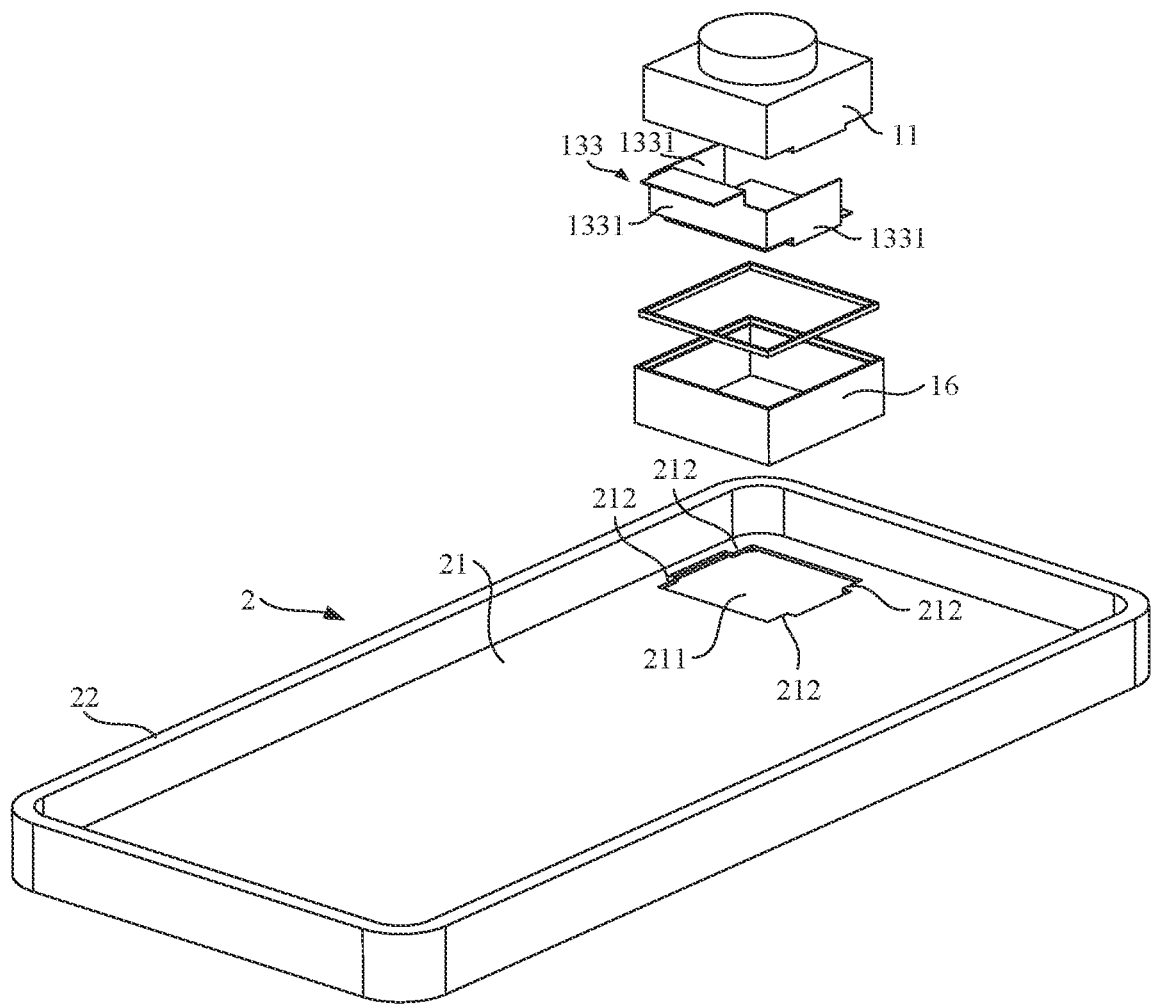
FIG. 5 is an exploded view of FIG. 4.
Figure 6:
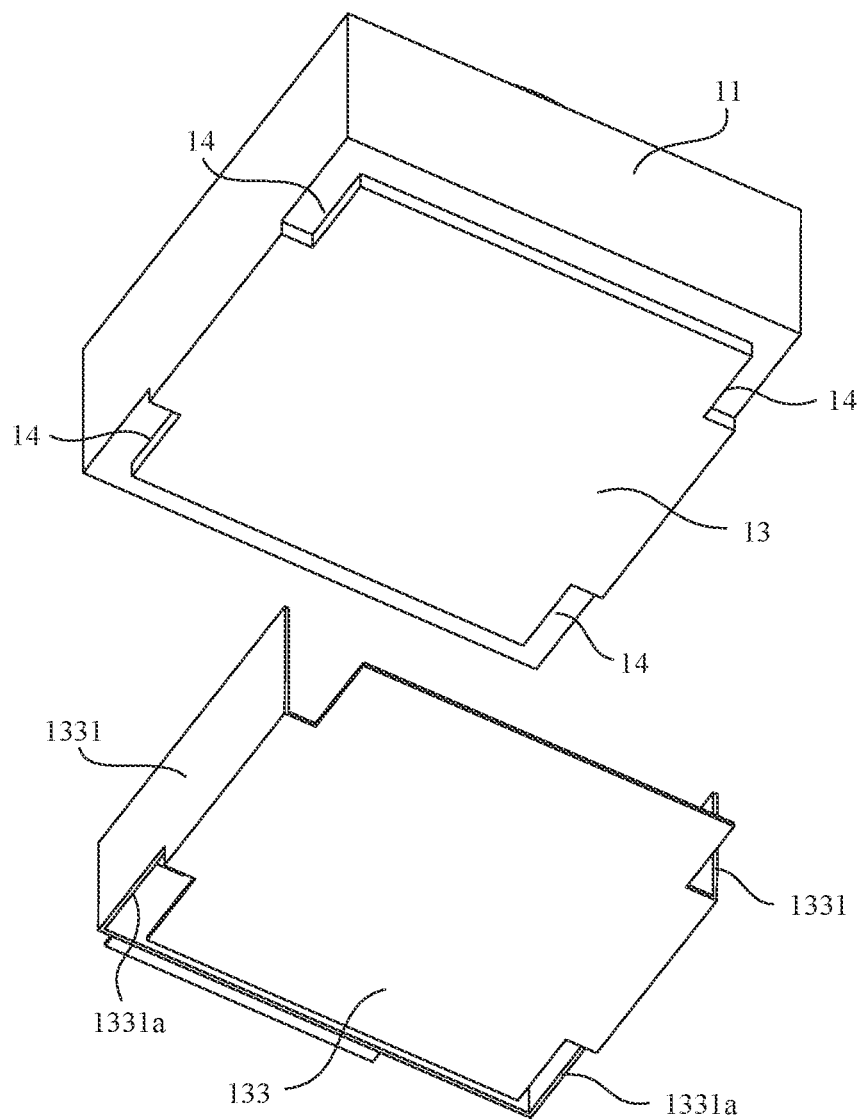
FIG. 6 is an exploded view of a camera module in FIG. 5.

FIG. 4 is a schematic diagram of a structure of a camera module mounted on a middle frame according to an embodiment of this application; FIG. 5 is an exploded view of FIG. 4; and FIG. 6 is an exploded view of a camera module in FIG. 5.

Referring to FIG. 4, in the electronic device 100 in this embodiment, a middle frame 2 includes a frame portion 22 and a support plate 21 connected to at least a part of an area on an inner edge of the frame portion 22. The frame portion 22 may be adapted to a contour of the electronic device 100. The frame portion 22 is disposed around an outer circumference of the electronic device 100. The display panel 4 and the rear cover 3 are respectively located on both sides of the middle frame 2, and the display panel 4 and the rear cover 3 are supported and limited by using the frame portion 22. The support plate 21 is connected to the inner edge of the frame portion 22, that is, the support plate 21 is located in an area enclosed by the frame portion 22. Some components in the electronic device 100 may be mounted on the support plate 21. For example, components such as the camera module 1, a speaker, and an earpiece may be mounted on the support plate 21.

For example, the support plate 21 may be connected to a side that is of the frame portion 22 and that is close to the display panel 4, a surface of a side that is of the support plate 21 and that faces the display panel 4 may be a plane, and the display panel 4 may be bonded to the surface of the side of the support plate 21 through a glue dispensing process or the like. A mounting space is formed between the support plate 21 and the rear cover 3. Components such as the camera module 1, the speaker, and the earpiece may be mounted on a surface of a side of that is of the support plate 21 and that faces the rear cover 3.

The support plate 21 may cover all areas enclosed by the frame portion 22 (except an area in which a through hole or an opening is disposed on the support plate 21); or the support plate 21 covers only a part of an area enclosed by the frame portion 22, for example, the support plate 21 is connected to only parts on which the foregoing components need to be mounted. This is not limited in this embodiment.

Referring to FIG. 5, in this embodiment, the camera module 1 mounted on the middle frame 2 includes a lens assembly 11 and a dimming conversion assembly. An axial direction of the lens assembly 11 is, for example, a thickness direction of the electronic device 100, and the dimming conversion assembly is mounted on an out-light side of the lens assembly 11. External ambient light enters the camera module 1 from an in-light side of the lens assembly 11. After being emitted from the out-light side of the lens assembly 11, the light enters the dimming conversion assembly, and the dimming conversion assembly converts a light signal into an electrical signal. thereby implementing an imaging function of the camera module 1.

For the camera module 1 in the mounting space between the support plate 21 and the rear cover 3, in an example in which the camera module 1 is a front camera, the lens assembly II of the camera module 1 faces a direction of the display panel 4, and the dimming conversion assembly faces a direction of the rear cover 3. A light-transmitting hole is disposed on the support plate 21, and an in-light surface of the lens assembly Il is located in the light-transmitting hole, so that the lens assembly 11 receives light incident from one side of the display panel 4. In an example in which the camera module 1 is a rear camera, the lens assembly 11 of the camera module 1 faces a direction of the rear cover 3, and the dimming conversion assembly faces a direction of the display panel 4.

The camera module 1 is located in the mounting space between the support plate 21 and the rear cover 3. To reduce an occupied space of the camera module 1 in an axial direction of the camera module 1, for the front camera, a front end of the lens assembly 11 may pass through a light-transmitting hole disposed on the support plate 21, thereby reducing a height that is of the camera module 1 and that is located in the mounting space; and for the rear camera, an opening 211 may be disposed on the support plate 21, so that at least a part of the thickness of the dimming conversion assembly of the camera module 1 extends into the opening 211, thereby reducing a height of that is of the camera module 1 and that is located in the mounting space.

In some embodiments, for a position of the front camera disposed in the electronic device 100, there may be a mounting space between the support plate 21 and the display panel 4, and the front camera may be mounted in the mounting space between the display panel 4 and the support plate 21. In this case, the dimming conversion assembly of the front camera faces the support plate 21, the opening 211 is disposed on a part that is of the support plate 21 and that corresponds to the front camera, and at least a part of the thickness of the dimming conversion assembly of the front camera extends into the opening 211.

Referring to FIG. 5, in this embodiment, for a mounting structure in which at least a part of the thickness of the dimming conversion assembly of the camera module 1 extends into the opening 211 on the support plate 21, the camera module 1 may be the rear camera located in the mounting space between the back cover 3 and the support plate 21, or may be the front camera in the mounting space between the display panel 4 and the support plate 21.

As a plane size of the lens assembly 11 gradually increases, to prevent the opening 211 disposed on the support plate 21 from affecting the structural strength of the middle frame 2, referring to FIG. 6, at least a part of an area of a circumferential edge of the dimming conversion assembly contracts in the lens assembly 11, so that a size of the dimming conversion assembly is reduced. In a plane direction of the camera module 1 (in a direction perpendicular to an axial direction of the camera module 1), an avoidance space is formed between the edge of the dimming conversion assembly and the edge of the lens assembly 11. Therefore, the inner edge of the opening 211 on the support plate 21 may extend into the avoidance space, thereby reducing a size of the opening 211 and improving strength of the middle frame 2.

Specifically, an inner concave portion 14 is disposed on the edge of the dimming conversion assembly. In a plane direction of the camera module 1 (a plane perpendicular to a light axis of the camera module 1), an edge of the inner concave portion 14 is located on an inner side of the edge of the lens assembly 11, that is, an edge of the inner concave portion 14 contracts in the edge of the lens assembly 11, and an avoidance space is formed between the edge of the inner concave portion 14 and the edge of the lens assembly 11. A reinforcing portion 212 is formed on the inner edge of the opening 211 on the support plate 21. The reinforcing portion 212 extends to an inner side of the opening 211 and extends into the avoidance space. A cross-sectional area of the opening 211 is smaller than a cross-sectional area of the lens assembly 11, a size of the opening 211 is reduced, and a coverage area of the support plate 21 is increased, so that structural strength of the middle frame 2 is enhanced, thereby providing a reliable guarantee for mounting of the camera module 1

With reference to FIG. 4, when the camera module 1 is mounted, the camera module 1 is mounted on the middle frame 2 from the mounting space formed between the support plate 21 and the rear cover 3 (the display panel 4), the dimming conversion assembly of the camera module 1 faces the support plate 21, and the dimming conversion assembly extends into the opening 211 from a side that is of the dimming conversion assembly and that is away from the lens assembly 11. Referring to FIG. 6, to enable the dimming conversion assembly to extend into an opening area enclosed by the reinforcing portion 212 of an inner edge of the opening 211, the inner concave portion 14 should be located on a side that is of the dimming conversion assembly and that is away from the lens assembly 11, so that the side that is of the dimming conversion assembly and that is away from the lens assembly 11 contracts in the lens assembly 11, and then the dimming conversion assembly extends into the opening area enclosed by the reinforcing portion 212 on the inner edge of the opening 211.

The inner concave portion 14 occupies at least a part of the thickness of the dimming conversion assembly, so that an avoidance space formed between the edge of the inner concave portion 14 and the edge of the lens assembly 11 occupies the at least a part of the thickness of the dimming conversion assembly. Correspondingly, the reinforcing portion 212 formed on an inner edge of the opening 211 may occupy at least a part of the thickness of a support plate 21. In addition, in a thickness direction of the dimming conversion assembly, to enable a larger part of the dimming conversion assembly extend into the opening 211, the reinforcing portion 212 may be flush with a side surface that is of the support plate 21 and that is away from the lens assembly 11.

Figure 7A:
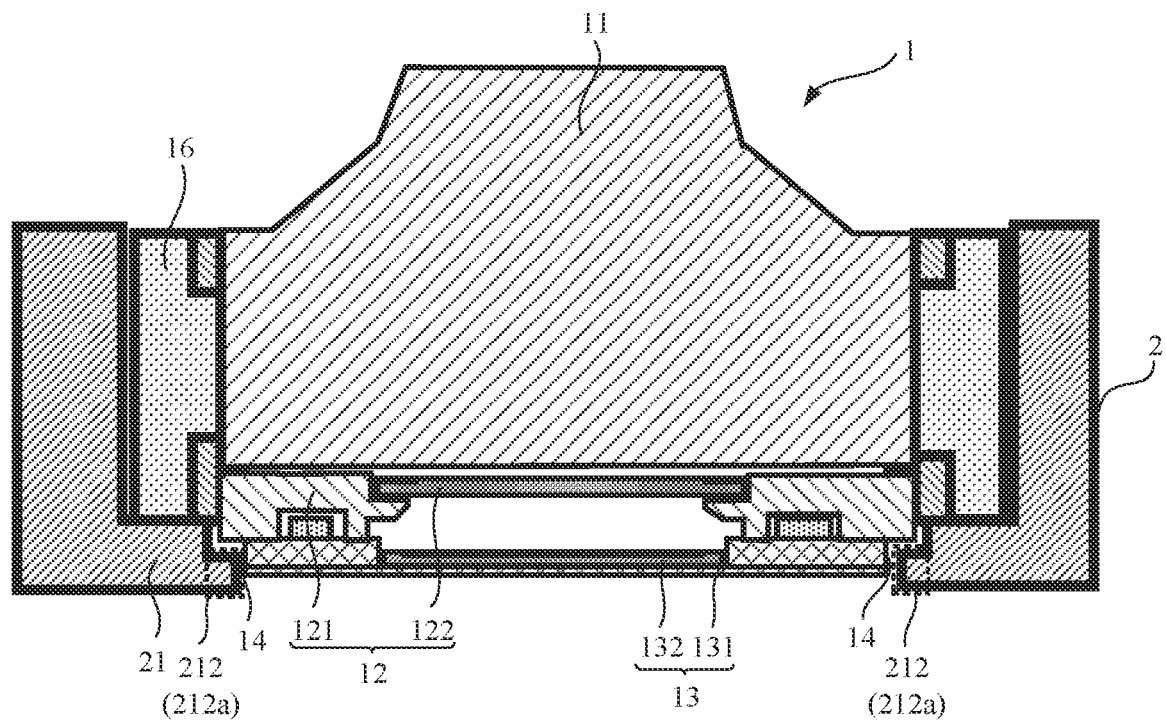
FIG. 7a is a sectional view of a mounting structure of a camera module according to an embodiment of this application.
Figure 7B:
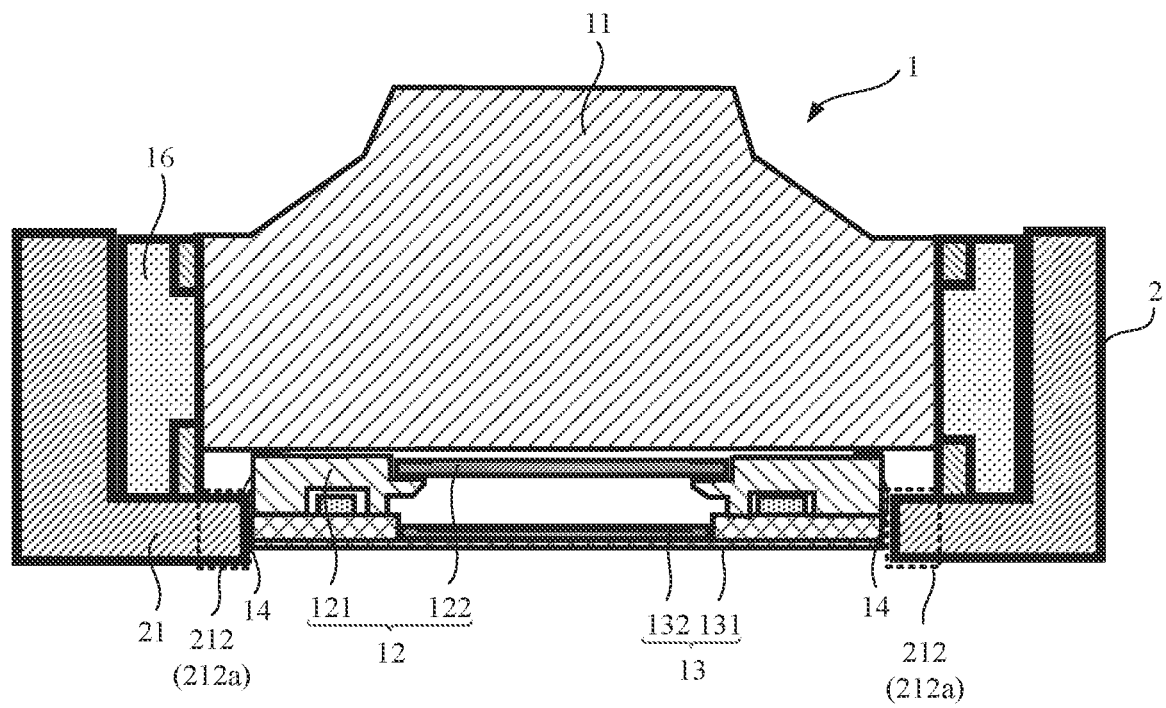
FIG. 7b is a sectional view of another mounting structure of a camera module according to an embodiment of this application.
Figure 7C:
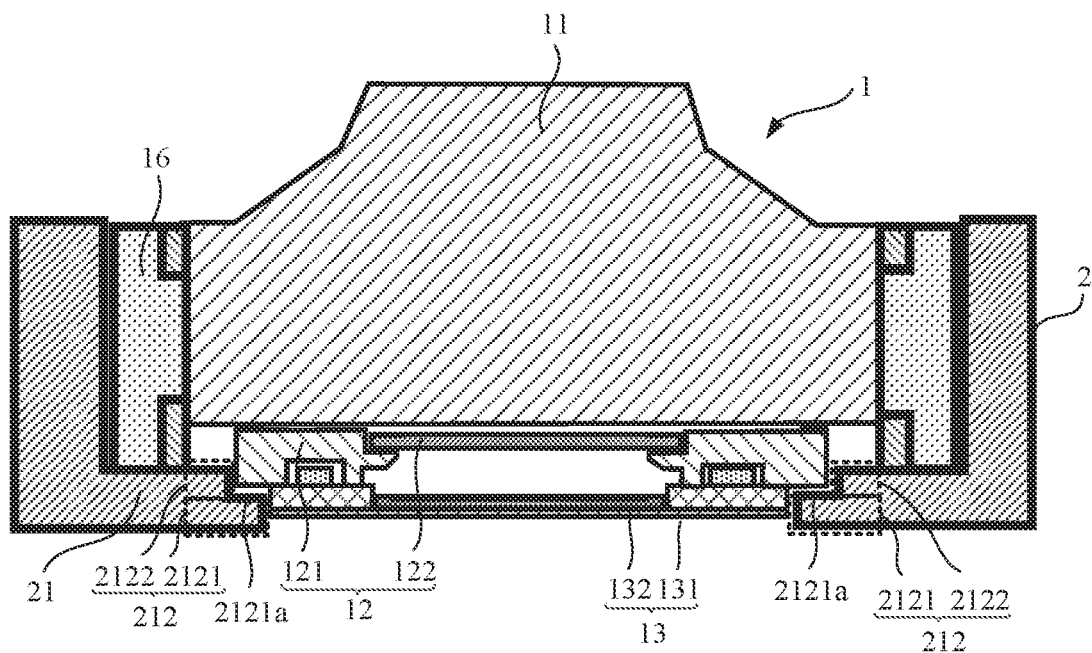
FIG. 7c is a sectional view of a third mounting structure of a camera module according to an embodiment of this application.

FIG. 7a is a sectional view of a mounting structure of a camera module according to an embodiment of this application; FIG. 7b is a sectional view of another mounting structure of a camera module according to an embodiment of this application; and FIG. 7c is a sectional view of a third mounting structure of a camera module according to an embodiment of this application.

Referring to FIG. 7a, the dimming conversion assembly includes a light filtering assembly 12 and an image sensor assembly 13. The light filtering assembly 12 and the image sensor assembly 13 are sequentially stacked on an out-light side of the lens assembly 11, the light filtering assembly 12 is mounted on the out-light side of the lens assembly 11, and the image sensor assembly 13 is connected to a side that is of the light filtering assembly 12 and that is away from the lens assembly 11. The image sensor assembly 13 extends into the opening 211. For example, the image sensor assembly 13 is located within a thickness range of the support plate 21, or a part or all of the thickness of the image sensor assembly 13 passes through the opening 211 and extends to the outside of the support plate 21, and at least a part of the thickness of the light filtering assembly 12 extends into the opening 211.

In the dimming conversion assembly, because the image sensor assembly 13 is disposed away from the lens assembly 11, the inner concave portion 14 is disposed at least on the image sensor assembly 13, or the inner concave portion 14 is disposed on the image sensor assembly 13 and the light filtering assembly 12.

Specifically, referring to FIG. 7a, the image sensor assembly 13 includes a substrate 131 and an image sensor 132. For example, the substrate 131 may be a printed circuit board (Printed Circuit Board, PCB), the image sensor 132 may be bonded to the PCB, and the image sensor 132 corresponds to the out-light side of the lens assembly 11. In addition, the image sensor assembly 13 may further include a flexible printed circuit (Flexible Printed Circuit. FPC 133), one end of the FPC 133 is connected to the substrate 131, and the other end of the FPC 133 extends to the outside of the camera module 1 and is connected to a mainboard in the electronic device 100

The light filtering assembly 12 includes a support frame 121 and a light filter 122. A middle area of the support frame 121 is provided with a mounting port. The light filter 122 is bonded to the support frame 121 and covers the mounting port. An area that is on the substrate 131 and that is located on a periphery of the image sensor 132 is a packaging area, and a packaging adhesive layer is disposed in the packaging area. The support frame 121 is bonded to the packaging area of the substrate 131 through the packaging adhesive layer.

When the camera module 1 is operating, the processor on the mainboard controls the camera module 1 to photograph. External ambient light enters the camera module 1 from the in-light side of the lens assembly 11, passes through the light filter 122 and irradiates to the image sensor 132 after the light is emitted from the lens assembly 11, and then the light filter 122 is used to filter light, and then the image sensor 132 converts a light signal into an electrical signal to perform imaging, to improve an imaging effect.

A size of the light filter 122 and a size of the image sensor 132 match a size of an out-light surface of the lens assembly 11. After the plane size of the lens assembly 11 increases, the size of the light filter 122 and the size of the image sensor 132 may increase accordingly, or the size of the light filter 122 and the size of the image sensor 132 remain unchanged. The inner concave portion 14 is formed on the substrate 131 of the image sensor assembly 13, or the inner concave portion 14 is formed on the substrate 131 of the image sensor assembly 13 and the support frame 121 of the light filtering assembly 12, and a local size of the edge of the dimming conversion assembly is reduced, to form an avoidance space between the edge of the dimming conversion assembly and the edge of the lens assembly 11.

Still referring to FIG. 7a, in an example in which the camera module 1 is a fixed-focus module (FF module), the lens assembly 11 may include a lens barrel (not shown in the figure) and a plurality of lenses (not shown in the figure) packaged in the lens barrel, and the plurality of lenses may be disposed near an in-light side of the lens barrel. The plurality of lenses may be stacked along an axial direction of the lens barrel, and a light axis of the lens may be parallel to the axial direction of the lens barrel. For example, the light axis of the lens assembly 11 may pass through centers of the plurality of lenses. The dimming conversion assembly may be bonded to an out-light side of the lens barrel. For example, the support frame 121 of the light filtering assembly 12 is bonded to an end surface of the out-light side of the lens barrel.

An increase in a plane size of the lens assembly 11 of the fixed-focus module may be an increase in a plane size of a lens disposed in the lens barrel. In this way, a luminous flux of the lens assembly 11 may be increased, thereby improving a photographing effect of the camera module 1. In this case, the size of the light filter 122 and the size of the image sensor 132 may increase accordingly, and the sizes of the support frame 121 and the substrate 131 are reduced, so that a plane size of the dimming conversion assembly matches the plane size of the lens assembly 11.

For example, in an example in which the camera module 1 is an autofocus module (AF module), the lens assembly 11 may include a lens 111 (not shown in the figure) and a drive apparatus 112 (not shown in the figure). The drive apparatus 112 is configured to drive the lens 111 to move. For example, the drive apparatus 112 drives the lens 111 to move along a light axis direction of the lens 111, to implement a focusing function of the camera module 1. Alternatively, the drive apparatus 112 drives the lens 111 to move along a plane direction in which the lens 111 is located; that is, the drive apparatus 112 drives the lens 111 to move along a direction perpendicular to the light axis of the lens 111, to implement an image stabilization function of the camera module 1. The drive apparatus 112 includes a housing 1121, and the lens 111 is movably disposed in the housing 1121. The dimming conversion assembly may be connected to an outer surface of the housing 1121 of the drive apparatus 112. For example, a support frame 121 of the light filtering assembly 12 is bonded to an outer surface that is of the housing 1121 and that corresponds to an out-light side of the lens 111.

An increase in a plane size of the lens assembly 11 of the autofocus module may be an increase in a plane size of the housing 1121 of the drive apparatus 112, while a plane size of the lens 111 remains unchanged. In this case, a size of the light filter 122 and a size of the image sensor 132 may remain unchanged, and a size that are of the support frame 121 and the substrate 131 may be correspondingly increased, so that a plane size of the dimming conversion assembly matches the size of the lens assembly 11. Alternatively, a plane size of the housing 1121 of the drive apparatus 112 is not large, and a plane size of the lens 111 increases. For example, a plane size of a lens in the lens 111 increases, and in this case, a size of the light filter 122 and a size of the image sensor 132 may increase accordingly, and a size of the support frame 121 and the substrate 131 remains unchanged or decreases, so that a plane size of the dimming conversion assembly matches the plane size of the lens assembly 11.

Referring to FIG. 7a, in an implementation, the inner concave portion 14 on the dimming conversion assembly may be formed only on the image sensor assembly 13. In this case, in a plane direction of the camera module 1 (a plane perpendicular to the light axis of the camera module 1), an edge of the support frame 121 of the light filtering assembly 12 is flush with an edge of the lens assembly 11, at least a part of a circumferential area of an edge of the substrate 131 of the image sensor assembly 13 includes the inner concave portion 14, and an avoidance space is formed between an edge of the inner concave portion 14 of the substrate 131 and the edge of the lens assembly 11.

Corresponding to the inner concave portion 14 on the substrate 131, the reinforcing portion 212 that extends from the inner edge of the opening 211 on the support plate 21 extends into the avoidance space outside a peripheral side of the substrate 131, and a part that is of the inner edge of the opening 211 and that corresponds to the supporting frame 121 is located on an outer side of a side wall surface of the lens assembly 11. Referring to FIG. 7, in this case, the reinforcing portion 212 is a step portion 212a that extends inward from the inner edge of the opening 211, and in a thickness direction of the support plate 21, the step portion 212a is located on a part that is of the support plate 21 and that is away from the lens assembly 11. For example, the step portion 212a is flush with a side surface that is of the support plate 21 that is away from the lens assembly 11.

Referring to FIG. 7b and FIG. 7c, in another implementation, the image sensor assembly 13 and the light filtering assembly 12 jointly form the inner concave portion 14 on the dimming conversion assembly. Specifically, at least a part of a circumferential area of an edge of the substrate 131 of the image sensor assembly 13 is provided with a first inner concave portion 141, and at least a part of a circumferential area of an edge of the support frame 121 of the light filtering assembly 12 is provided with a second inner concave portion 142. Both the edge of the first inner concave portion 141 and the edge of the second inner concave portion 142 are located on the inner side of the edge of the lens assembly 11, and the first inner concave portion 141 and the second inner concave portion 142 jointly constitute the inner concave portion 14 of the dimming conversion assembly.

A first avoidance space is formed between the edge of the first inner concave portion 141 and the edge of the lens assembly 11, a second avoidance space is formed between the edge of the second inner concave portion 142 and the edge of the lens assembly 11, and the first avoidance space and the second avoidance space jointly constitute the avoidance space. Correspondingly, the reinforcing portion 212 that extends from the inner edge of the opening 211 on the support plate 21 includes a part that extends into the first avoidance space between the edge of the first inner concave portion 141 and the lens assembly 11, and further includes a part that extends into the second avoidance space between the edge of the second inner concave portion 142 and the lens assembly 11.

The second inner concave portion 142 of the edge of the support frame 121 corresponds to the first inner concave portion 141 on the edge of the substrate 131, and the reinforcing portion 212 of the inner edge of the opening 211 on the support plate 21 matches the first inner concave portion 141 and the second inner concave portion 142, so that the first inner concave portion 141 on the substrate 131 extends into a part in which the inner edge of the opening 211 of the reinforcing portion 212 is disposed corresponding to the second inner concave portion 142 of the edge of the support frame 121, and then the substrate 131 passes through an opening area enclosed by a part that is of the second inner concave portion 142 and that corresponds to the reinforcing portion 212, and extends into an opening area enclosed by a part that is of the first inner concave portion 141 and that corresponds to the reinforcing portion 212

Referring to FIG. 7b, in a specific implementation, an orthographic projection of the image sensor assembly 13 on the light filtering assembly 12 may completely cover the light filtering assembly 12, that is, in a thickness direction of the dimming conversion assembly, a projection of the image sensor assembly 13 on the light filtering assembly 12 completely covers the light filtering assembly 12. For example, the circumferential edge of the support frame 121 of the light filtering assembly 12 is flush with the circumferential edge of the substrate 131 of the image sensor assembly 13, that is, the edge of the second inner concave portion 142 on the support frame 121 is flush with the edge of the first inner concave portion 141 on the substrate 131. In this way, the first avoidance space formed between the edge of the second inner concave portion 142 of the support frame 121 and the edge of the lens assembly 11 may be the same as a size of the second avoidance space formed between the edge of the first inner concave portion 141 of the substrate 131 and the edge of the lens assembly 11.

Alternatively, an edge of the second inner concave portion 142 on the support frame 121 contracts in an edge of the first inner concave portion 141 on the substrate 131, and a cross-sectional area of the second avoidance space formed between the edge of the second inner concave portion 142 on the support frame 121 and the edge of the lens assembly 11 is larger than a cross-sectional area of the first avoidance space formed between the edge of the first inner concave portion 141 on the substrate 131 and the edge of the lens assembly 11.

For a case in which a circumferential edge of the support frame 121 is flush with a circumferential edge of the substrate 131, and a cross-sectional area of the second avoidance space is the same as a cross-sectional area of the first avoidance space, in a thickness direction of the support plate 21, the inner edge of the opening 211 may integrally extend inward to form a reinforcing portion 212, that is, the reinforcing portion 212 occupies a whole thickness of the support plate 21, surfaces on two sides of the reinforcing portion 212 are flush with surfaces on both sides of the support plate 21, and end surfaces of the reinforcing portion 212 (surfaces that are of the reinforcing portion 212 and that face the side wall of the dimming conversion assembly) are flush.

For a case in which an edge of the second inner concave portion 142 of the support frame 121 contracts in an edge of the first inner concave portion 141 on the substrate 131, a cross-sectional area of the second avoidance space is larger than a cross-sectional area of the first avoidance space Because the substrate 131 needs to pass through an opening area enclosed by a part that is of the reinforcing portion 212 and that extends into in the second avoidance space, a length of the part that is of the reinforcing portion 212 and that extends into the second avoidance space cannot exceed a width of the first avoidance space. Based on this, a part that is of the reinforcing portion 212 and that extends into the second avoidance space may be the same as a part that is of the reinforcing portion 212 and that extends into the first avoidance space, that is, end surfaces of the reinforcing portion 212 are flush.

Referring to FIG. 7c, in another specific implementation, the first inner concave portion 141 on the circumferential edge of the substrate 131 of the image sensor assembly 13 may be located on an inner side of the second inner concave portion 142 on the circumferential edge of the support frame 121 of the light filtering assembly 12; that is, the first inner concave portion 141 on the edge of the substrate 131 contracts in the second inner concave portion 142 on the edge of the support frame 121, and the second inner concave portion 142 on the edge of the support frame 121 contracts in the edge of the lens assembly 11. In this way, a cross-sectional area of the first avoidance space formed between the edge of the first inner concave portion 141 of the substrate 131 and the edge of the lens assembly 11 is larger than a cross-sectional area of the second avoidance space formed between the edge of the second inner concave portion 142 of the support frame 121 and the edge of the lens assembly 11.

Correspondingly, in a thickness direction of the support plate 21, the reinforcing portion 212 may include a first reinforcing portion 2121 and a second reinforcing portion 2122. The first reinforcing portion 2121 correspondingly extends into the first avoidance space, and the second reinforcing portion 2122 correspondingly extends into the second avoidance space. Corresponding to a positional relationship between the substrate 131 and the support frame 121, the first reinforcing portion 2121 is located on a part that is of the support plate 21 and that is away from the lens assembly 11, and the second reinforcing portion 2122 is located on a part that is of the support plate 21 and that is close to the lens assembly 11.

The edge of the first inner concave portion 141 contracts in the edge of the second inner concave portion 142, and the cross-sectional area of the first avoidance space is larger than the cross-sectional area of the second avoidance space. To use an extra space of the first avoidance space, an extension length of the first reinforcing portion 2121 may be greater than an extension length of the second reinforcing portion 2122, and an end portion of the first reinforcing portion 2121 extends outside the second reinforcing portion 2122. In this way, an extension length of the reinforcing portion 212 can be increased, an area of an opening 211 on the support plate 21 can be reduced, and structural strength of the support plate 21 can be improved. A step surface 212 1a is formed between the first reinforcing portion 2121 and the second reinforcing portion 2122, and the step surface 2121a faces the light filtering assembly 12.

Figure 8:
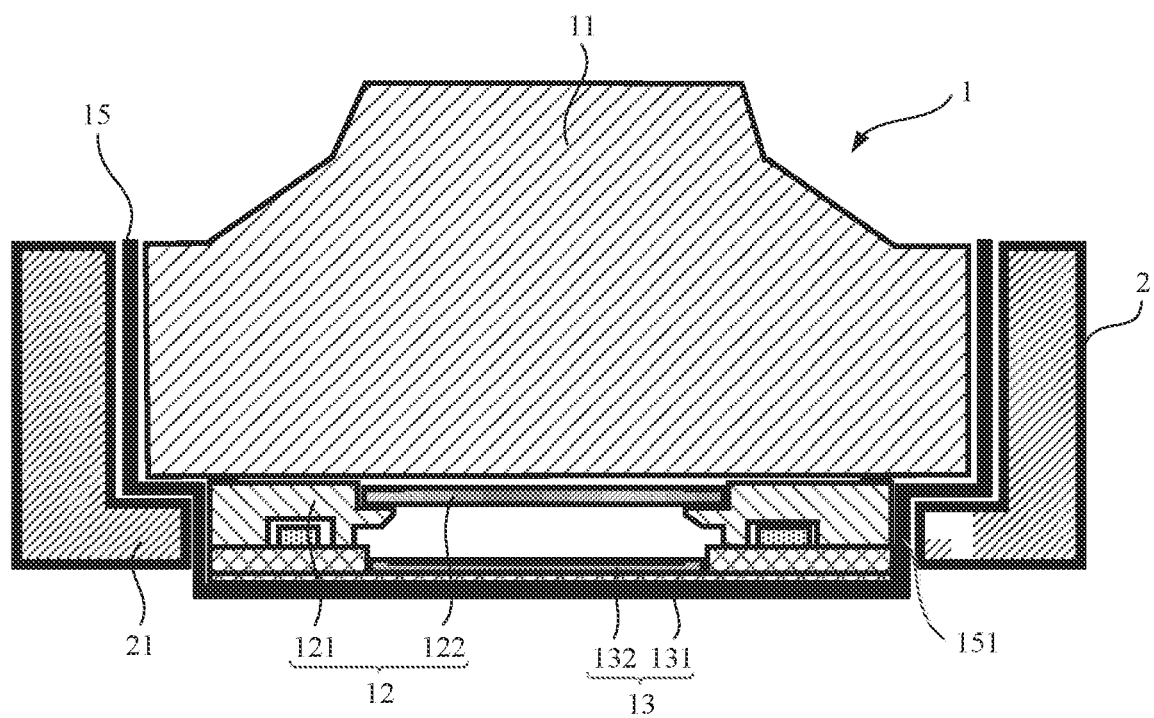
FIG. 8 is a sectional view of a fourth mounting structure of a camera module according to an embodiment of this application.

FIG. 8 is a sectional view of a fourth mounting structure of a camera module according to an embodiment of this application. Referring to FIG. 8, the camera module 1 may further include a protective cover 15, and the protective cover 15 wraps outside the dimming conversion assembly and the lens assembly 11, where the protective cover 15 wraps the whole dimming conversion assembly and a side wall of the lens assembly 11, and an in-light side of the lens assembly 11 is exposed outside the protective cover 15, so that external ambient light enters the lens assembly 11.

For example, in an example in which the camera module 1 is an autofocus module. because the lens 111 may be moved in the housing 1121 of the drive apparatus 112, a gap exists between the lens 111 and the housing 1121, and external foreign matters such as dust and water vapor may easily enter the dimming conversion assembly through the gap between the lens 111 and the housing 1121. This affects the light filter 122 and the image sensor 132, and affects an imaging effect of the camera module 1. The protective cover 15 is disposed outside the dimming conversion assembly and the lens assembly 11, and the protective cover 15 may serve as a sealing function, to prevent foreign matter in an external environment from entering the dimming conversion assembly, and protect performance of the dimming conversion assembly.

For the fixed-focus module, because the lens is packaged in the lens 111, the lens assembly 11 has better sealing property, and the dimming conversion assembly is usually packaged in the lens assembly 11 by using sealing adhesive. Therefore, overall sealing performance of the fixed-focus module is better. Therefore, the protective cover 15 may be disposed outside the dimming conversion assembly and the lens assembly 11, or the protective cover 15 may not be disposed outside the dimming conversion assembly and the lens assembly 11.

For example, the protective cover 15 sleeved outside the dimming conversion assembly and the lens assembly 11 may be a protective cover 15 made of a metal material, and the protective cover 15 made of the metal material has high strength, and further has a signal shielding function. to shield interference of an external signal on the camera module 1.

Corresponding to the inner concave portion 14 disposed on the circumferential outer edge of the dimming conversion assembly, the protective cover 15 includes a recessed portion 151, and the inner recessed portion 151 on the protective cover 15 is disposed around an outer side of the inner concave portion 14 of the dimming conversion assembly. A size of the inner recessed portion 151 of the protective cover 15 contracts inward, so that a size of the protective cover 15 at a lower part (a part that is of the protective cover 15 and that corresponds to the dimming conversion assembly) is smaller than a size of the protective cover 15 at an upper portion (a part that is of the protective cover 15 and that corresponds to the lens assembly 11). The inner concave portion 151 on the protective cover 15 provides a space for disposing the reinforcing portion 212 for the inner edge of the opening 211 on the support plate 21, so that the protective cover 15 may extend into an opening area enclosed by the reinforcing portion 212 on the inner edge of the opening 211.

Figure 9:
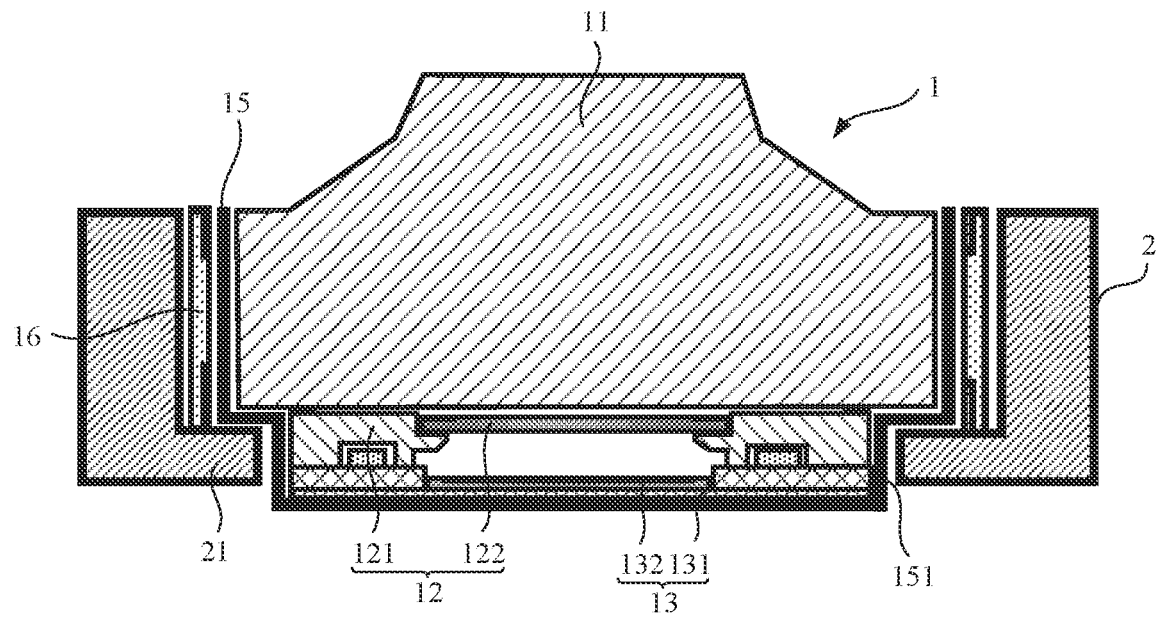
FIG. 9 is a sectional view of a fifth mounting structure of a camera module according to an embodiment of this application.

FIG. 9 is a sectional view of a fifth mounting structure of a camera module according to an embodiment of this application. Referring to FIG. 9, in some embodiments, the camera module 1 may further include a bracket 16, the bracket 16 is disposed on a side wall of the lens assembly 11, and the bracket 16 is fixedly connected to the middle frame 2. For example, one surface that is of the bracket 16 and that faces the support plate 21 is fixedly connected to the support plate 21, or a surface that is of the bracket 16 and that is opposite to the frame portion 22 is attached to the frame portion 22, and the bracket 16 is fixedly connected to the frame portion 22, and the camera module 1 is fixedly mounted on the middle frame 2 by using the bracket 16.

In a specific application, when no protective cover 15 wraps outside the camera module 1, the camera module 1 may be directly mounted and fastened to the middle frame 2 by relying on an outer side wall of the lens assembly 11. For example, a lens barrel of the lens assembly 11 of the fixed-focus assembly is connected to the middle frame 2, and a housing 1121 of a drive apparatus 112 of the autofocus module is connected to the middle frame 2. Alternatively, the camera module 1 is connected to the middle frame 2 by using the bracket 16 sleeved onto the outer side wall of the lens assembly 11.

When the protective cover 15 is wrapped on the outside of the camera module 1, the camera module 1 may be mounted on the middle frame 2 by relying on the protective cover 15. For example, the protective cover 15 wrapped by the outer wall of the lens barrel of the focusing assembly is bonded to the middle frame 2, or the protective cover 15 wrapped by the outer wall of the housing 1121 of the drive apparatus 112 of the autofocus module is bonded to the middle frame 2. Alternatively, referring to FIG. 9, a bracket 16 is further sleeved onto an outer side of the protective cover 15 outside the lens assembly 11. For example, the bracket 16 is bonded to an outer surface of the protective cover 15, and the bracket 16 is fixedly connected to the middle frame 2.

In addition to the protective cover 15 sleeved outside the dimming conversion assembly and the lens assembly 11, because the protective cover 15 has a specific thickness, the protective cover 15 also provides a specific space on the basis of an avoidance space between an outer edge of the inner concave portion 14 of the dimming conversion assembly and an outer edge of the lens assembly 11, to increase an extension length of the reinforcing portion 212 of the inner edge of the opening 211 on the support plate 21. Therefore, an area of an opening area enclosed by the reinforcing portion 212 is reduced, a coverage area of the support plate 21 is increased, strength of the middle frame 2 is enhanced, and reliability of the camera module 1 and the electronic device 100 is improved.

Figure 10A:
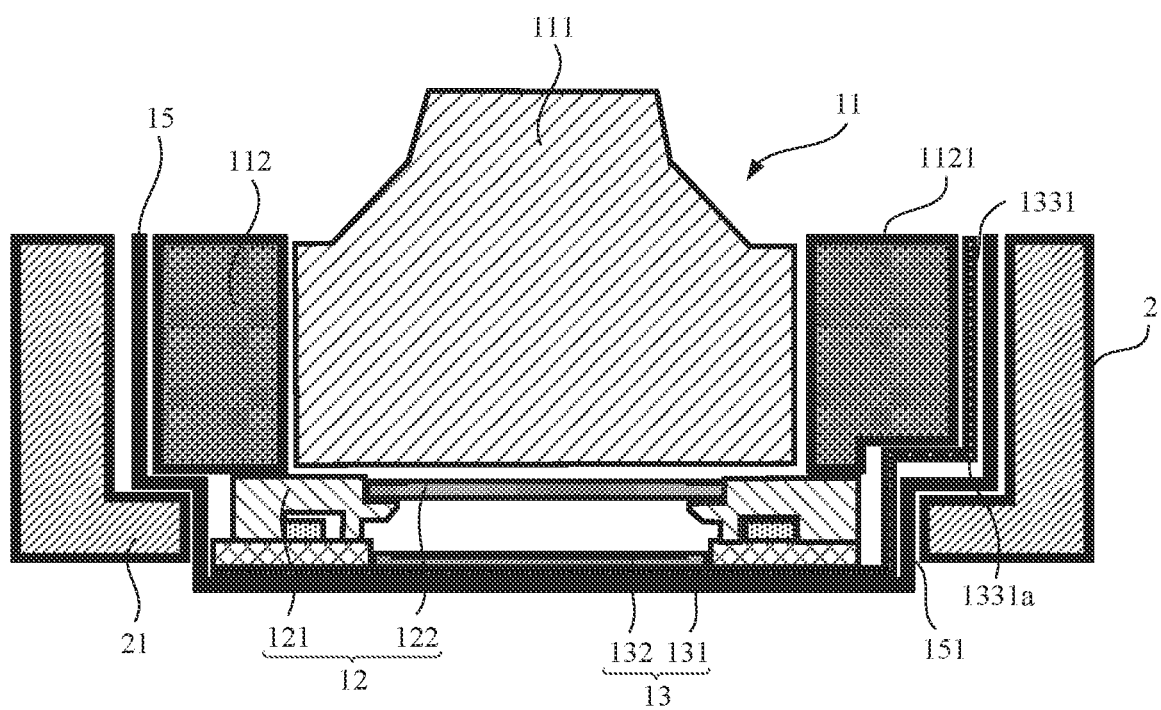
FIG. 10a is a sectional view of a sixth mounting structure of a camera module according to an embodiment of this application.
Figure 10B:
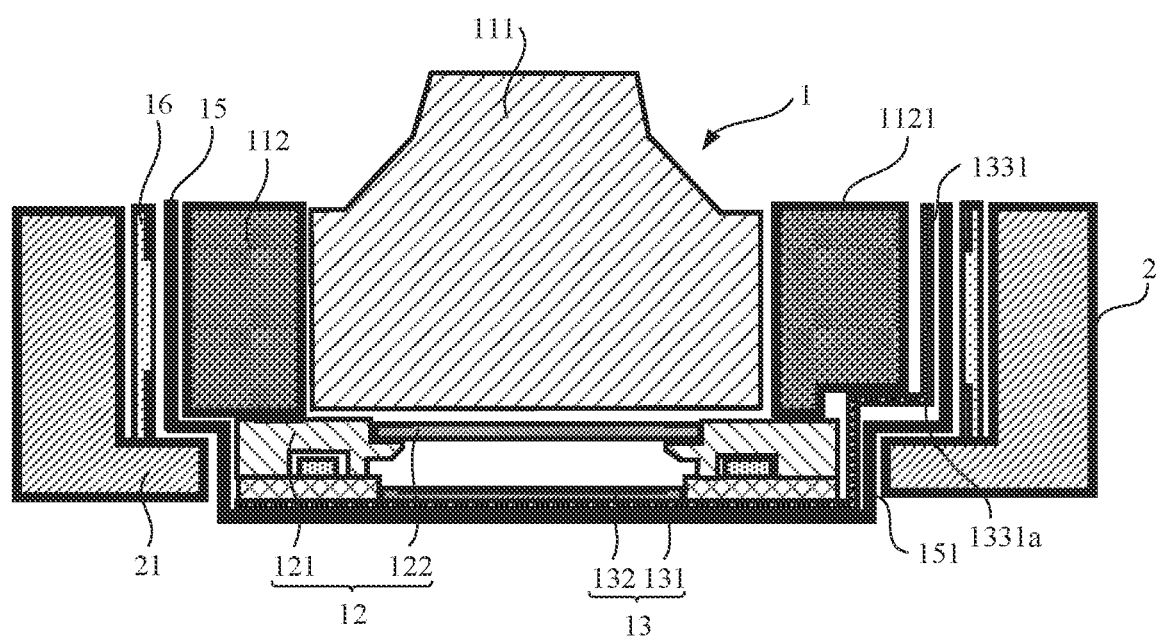
FIG. 10b is a sectional view of a seventh mounting structure of a camera module according to an embodiment of this application.

FIG. 10*a* is a sectional view of a sixth mounting structure of a camera module according to an embodiment of this application; and FIG. 10*b* is a sectional view of a seventh mounting structure of a camera module according to an embodiment of this application. Referring to FIG. 10*a* and FIG. 10*b*, using an autofocus module as an example, FIG. 10*a* shows a structure in which a protective cover 15 outside a housing 1121 of a drive apparatus 112 and a dimming conversion assembly is fastened to a middle frame 2; and FIG. 10*b* shows a structure in which a bracket 16 is sleeved outside a protective cover 15 that is wrapped by a side wall of a housing 1121 of a drive apparatus 112. Regardless of whether the bracket 16 is sleeved outside the protective cover 15, because the protective cover 15 wraps the whole dimming conversion assembly, the FPC 133 connected to a substrate 131 of an image sensor assembly 13 needs to extend from a side of an opening (an in-light side of a lens assembly 11) of the protective cover 15 to the outside of the camera module 1.

With reference to FIG. 5, for the fixed-focus module that is not provided with the protective cover 15. if a bracket 16 is sleeved onto an outer side wall of the lens assembly 11, and a bottom end that is of the bracket 16 and that faces the middle frame 2 on the support plate 21 is attached to the support plate 21; and if no avoidance gap is disposed between the bracket 16 and the support plate 21 for the FPC 133 to pass through, the FPC 133 needs to extend from a gap reserved between the outer side wall of the lens barrel and the inner wall of the bracket 16 to an in-light side of the lens assembly 11, and extend from the in-light side of the lens assembly 11 to the outside of the camera module 1.

In the following, that the camera module 1 is an autofocus module is used as an example, and the FPC 133 passes through a side of an opening (the in-light side of the lens assembly 11) of the protective cover 15. It can be understood that, when the camera module 1 is a fixed-focus module, a case in which the FPC 133 passes through the in-light side of the lens barrel may also exist. Details are not described again.

Referring to FIG. 10*a* and FIG. 10*b*, one end of the FPC 133 is connected to the substrate 131 of the image sensor assembly 13, and the other end of the FPC 133 extends from the out-light side of the lens assembly 11 to the outside of the camera module 1, and is connected to an external circuit (for example, which is connected to a mainboard). A middle segment that is of the FPC 133 and that is located between the substrate 131 and the out-light side of the lens assembly 11 is defined as a connection segment 1331 of the FPC 133. The connection segment 1331 is located on an outer side of a side wall of the housing 1121 of the drive apparatus 112, and the connection segment 1331 may extend along the side wall of the housing 1121.

A connection segment 1331 of the FPC 133 is located on an outer side of a side wall of the housing 1121 of the drive apparatus 112. In a plane direction of the camera module 1, the FPC 133 occupies at least a part of a space on an outer circumference of the camera module 1, and the FPC 133 increases a plane size of the camera module J. For the inner concave portion 14 that is on the dimming conversion assembly and that corresponds to a portion on which the connection segment 1331 of the FPC 133 is located, compared with a spacing between the edge of the inner concave portion 14 and a circumferential edge of the lens assembly 11, a spacing between the edge of the inner concave portion 14 and the connection section 1331 of the FPC 133 is greater.

A side that is of the connection segment 1331 and that faces the support plate 21 is defined as a first side 1331*a* of the connection segment 1331. With reference to FIG. 6, the spacing between at least a part of the segment of the first side 1331*a* of the connection segment 1331 of the FPC 133 and the support plate 21 may be greater than or equal to the spacing between the lens assembly 11 and the support plate 21; that is, in an axial direction of the camera module 1, the spacing between at least a part of the segment of the connection segment 1331 and the support plate 21 is greater than or equal to the spacing between the lens assembly 11 and the support plate 21. In this way, the reinforcing portion 212 of the inner edge of the opening 211 on the support plate 21 may extend from the outer side of the FPC 133 toward the edge of the inner concave portion 14 of the dimming conversion assembly, and the connection segment 1331 of the FPC 133 can provide an extension section of the reinforcing portion 212, increase an extension length of the reinforcing portion 212. reduce an area of an opening area enclosed by the reinforcing portion 212, increase a coverage area of the support plate 21, and improve structural strength of the middle frame 2.

Figure 11:
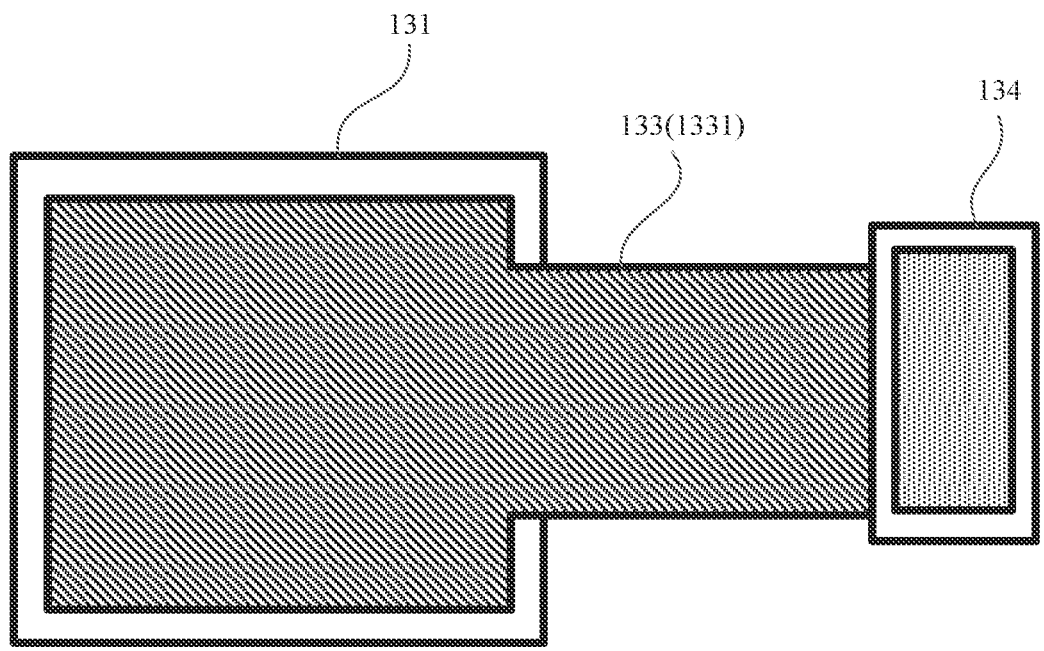
FIG. 11 is a schematic diagram of an FPC design according to an embodiment of this application.

FIG. 11 is a schematic diagram of an FPC design according to an embodiment of this application. Referring to FIG. 11, the flexible printed circuit may be connected to one side of the substrate 131, and extends along the side that is of the flexible printed circuit and that is connected to the substrate 131. With reference to FIG. 10*a* and FIG. 10*b*, using an autofocus module as an example, after the FPC 133 extends from a side that is of the FPC 133 and that is connected to the substrate 131, the FPC 133 extends from the side and along the outer side wall of the housing 1121 of the drive apparatus 112 in an axial direction of the lens assembly 11, and extends from a side that is of the housing 1121 and that is away from the image sensor assembly 13.

The connection segment 1331 of the FPC 133 is a part that corresponds to an outer side wall of the housing 1121, and a part of the connecting section 1331 of the FPC 133 on the outer side of the housing 1121 of the driving apparatus 112 corresponds to a corresponding side that is of the FPC 133 and that is connected to the substrate 131. Because the connection segment 1331 of the FPC 133 is located on only one side of the housing 1121, the connection segment 1331 of the FPC 133 on the side of the housing 1121 can provide an extra space, to increase an extension length of the reinforcing portion 212 at a corresponding part of the inner edge of the opening 211 on the support plate 21.

Figure 12:
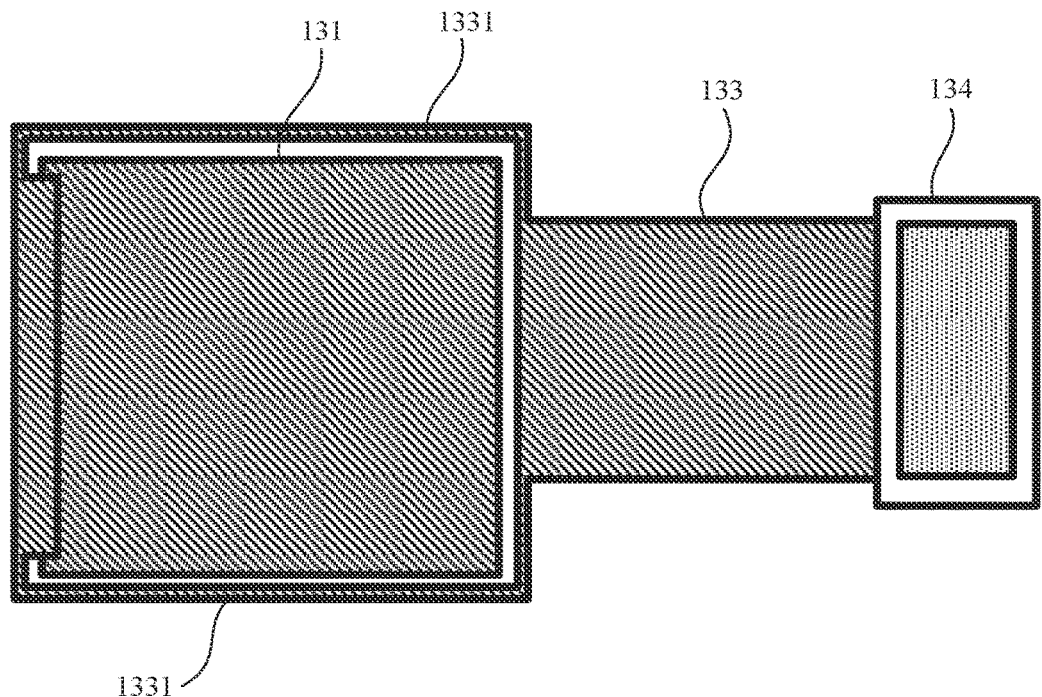
FIG. 12 is a schematic diagram of another FPC design according to an embodiment of this application.
Figure 13:
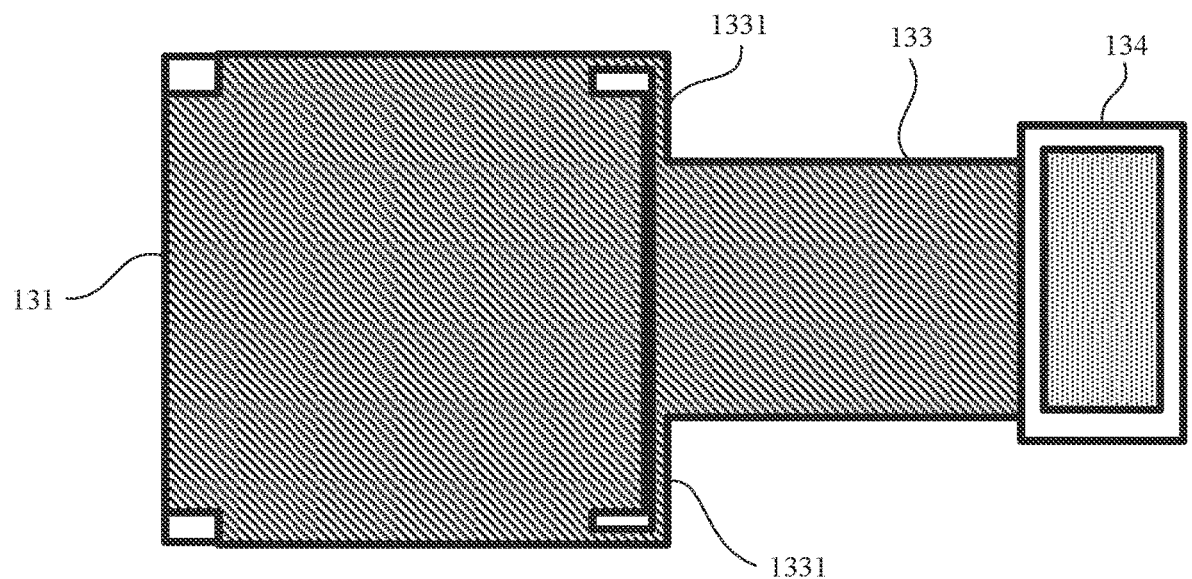
FIG. 13 is a schematic diagram of a third FPC design according to an embodiment of this application.

FIG. 12 is a schematic diagram of another FPC design according to an embodiment of this application; and FIG. 13 is a schematic diagram of a third FPC design according to an embodiment of this application. Referring to FIG. 12 and FIG. 13, in addition to the structure of the FPC 133 shown in FIG. 11, after the FPC 133 extends from one end that is of the FPC 133 and that is connected to the substrate 131 of the image sensor assembly 13, the FPC 133 may extend circumferentially around an outer side wall of the lens assembly 11, and after being wound, the FPC 133 extends from an in-light side of the lens assembly 11.

Figure 14A:
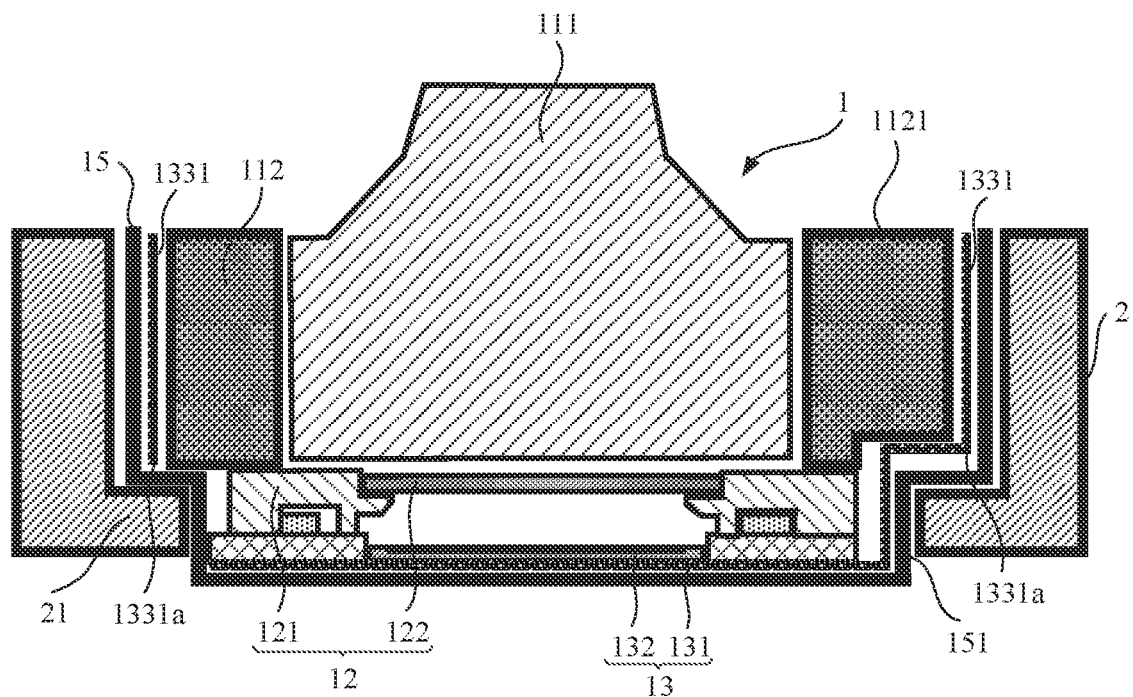
FIG. 14a is a sectional view of an eighth mounting structure of a camera module according to an embodiment of this application.
Figure 14B:
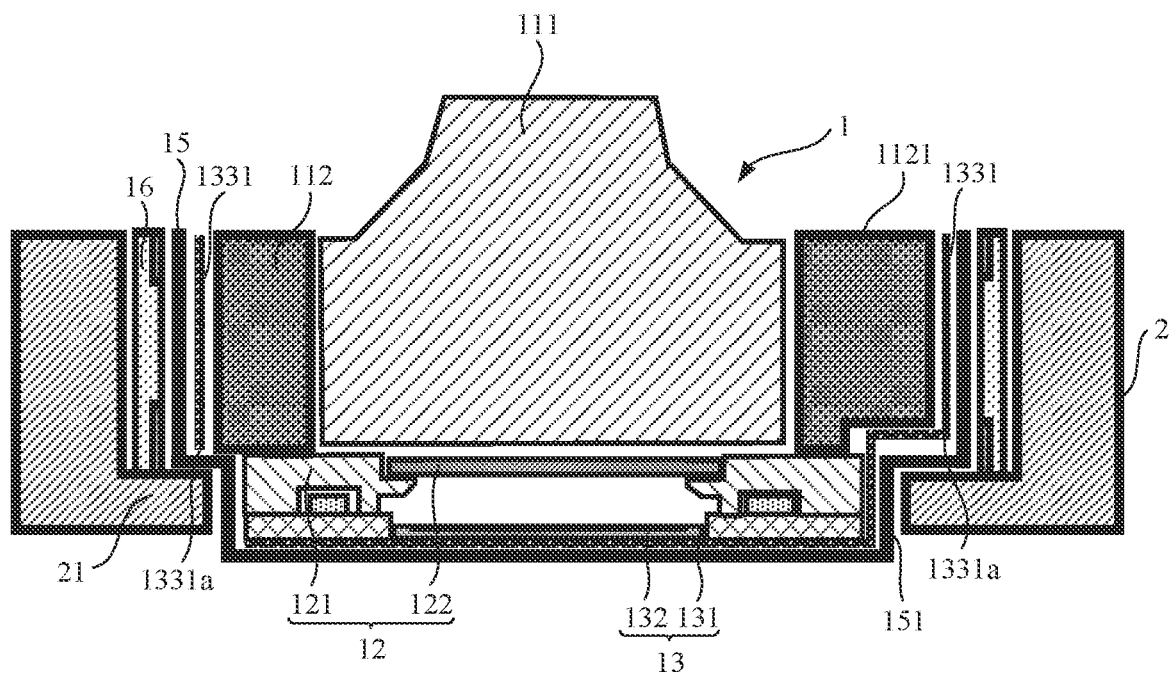
FIG. 14b is a sectional view of a ninth mounting structure of a camera module according to an embodiment of this application.

FIG. 14*a* is a sectional view of an eighth mounting structure of a camera module according to an embodiment of this application; and FIG. 14*b* is a sectional view of a ninth mounting structure of a camera module according to an embodiment of this application. Referring to FIG. 14*a* and FIG. 14*b*, still using an autofocus module as an example, the protective cover 15 in the camera module 1 is fixedly connected to the middle frame 2 in FIG. 14*a*, and the camera module 1 is fixedly connected to the middle frame 2 by using a bracket 16 sleeved on the protective cover 15 in FIG. 14*b*. A part of the FPC 133 wound around an outer side the outer side wall of the lens assembly 11 is the connection segment 1331 of the FPC 133, a width direction of the connection segment 1331 of the FPC 133 may be a thickness direction of the housing 1121 of the drive apparatus 112, and a first side 1331*a* of the connection segment 1331 of the FPC 133 faces the support plate 21.

For example, with reference to FIG. 12, in a specific implementation, the FPC 133 is connected to one side of the substrate 131. After the FPC 133 extends from one side that is of the FPC 133 and that is connected to the substrate 131, the FPC 133 extends to two opposite sides of the substrate 131. After the FPC 133 respectively wind around two opposite sides of the lens assembly 11, the FPC 133 extends the other side opposite to one side that is of the FPC 133 and that is connected to the substrate 131, extends from a direction that is of the side and that is away from the image sensor assembly 13 to the outside of the camera module 1.

With reference to FIG. 13, in another specific implementation, the FPC 133 is connected to two opposite sides of the substrate 131. After the FPC 133 extends from the two opposite sides that are of the FPC 133 and that are connected to the substrate 131, the FPC 133 on two sides extends toward each other along the outer side wall of the lens assembly 11, and winds around a side between two opposite sides that are of the lens assembly 11 and that correspond to the substrate 131, extends from a direction that is of the side and that is away from the image sensor assembly 13, and extends to the outside of the camera module 1.

In some other implementations, the FPC 133 may wind around the outer side of the lens assembly 11 in another winding manner. For example, the FPC 133 is connected to a side of the substrate 131, the FPC 133 extends from a side that is of the FPC 133 and that is of the substrate 131 to the outside of the camera module 1 after being wound around the outer side wall of the lens assembly 11 for half a circle or one circle in a clockwise or counterclockwise direction. This is not specifically limited in this embodiment.

The FPC 133 extends circumferentially around the lens assembly 11, so that a part that is of the FPC 133 and that winds around an outer side of the lens assembly 11 forms an active part of the FPC 133. This part of the FPC 133 provides a condition for translation of the image sensor assembly 13, and may be bent or extended in cooperation with the translation of the image sensor assembly 13. Therefore, the FPC 133 can be applied to the camera module 1 that compensates a hand shake amount by translating the image sensor assembly 13, to implement an image stabilization function of the camera module 1. A part that is of the FPC 133 and that is wound around an outer side of the outer side wall of the lens assembly 11 is the connection segment 1331 of the FPC 133.

With reference to FIG. 14*a* and FIG. 14*b*, the connection segment 1331 of the FPC 133 is circumferentially wound around an outer side of the lens assembly 11. Therefore, using two opposite sides of the lens assembly 11 as an example, outer sides of the two opposite sides of the lens assembly 11 may be provided with a connection segment 1331 of the FPC 133. In this way, the connection segment 1331 of the FPC 133 of the two opposite sides of the lens assembly 11 can provide an extra space, so that a larger avoidance space is formed between an edge of the inner concave portion 14 disposed on two opposite sides of the dimming conversion assembly and the corresponding side of the FPC 133, and then an extension length of the reinforcing portion 212 of two opposite sides of an inner edge of the opening 211 may be increased, and an area of an opening area enclosed by two sides of the reinforcing portion 212 can be reduced, and strength of the support plate 21 can be improved.

In addition, it can be understood that a connection segment 1331 of the FPC 133 is provided on each of the three sides of the lens assembly 11 in the circumferential direction, to increase an extension length of the reinforcing portion 212 of the three sides of the inner edge of the opening 211. Alternatively, a connection segment 1331 of the FPC 133 is provided on each side of the lens assembly 11 in the circumferential direction, to increase an extension length of the reinforcing portion 212 of each side of the inner edge of the opening 211. This is not specifically limited in this embodiment.

Figure 15A:
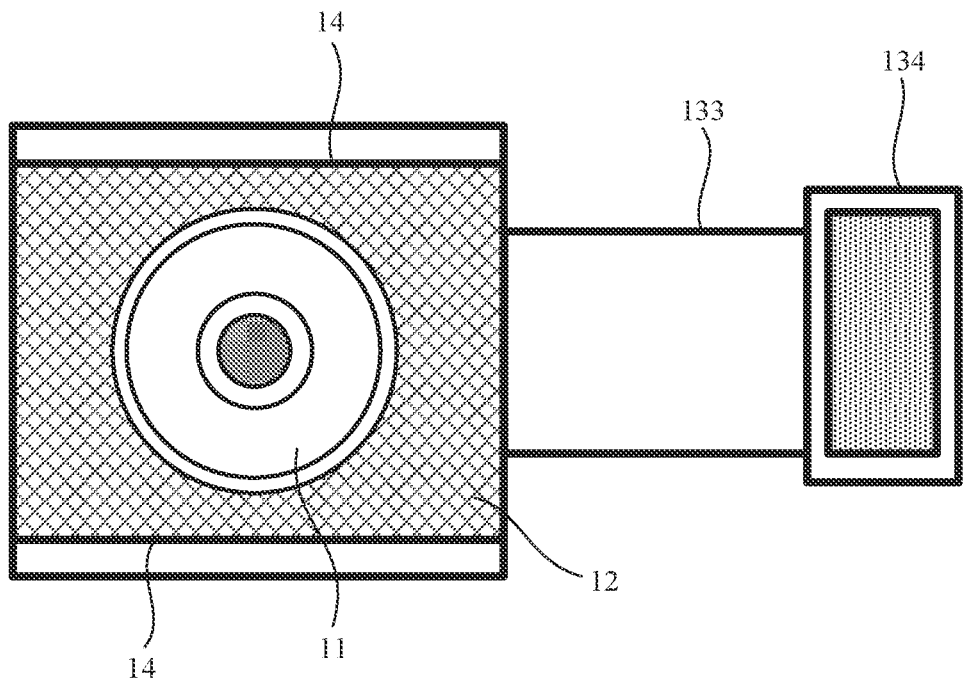
FIG. 15a is a schematic top view of a camera module according to an embodiment of this application.
Figure 15B:
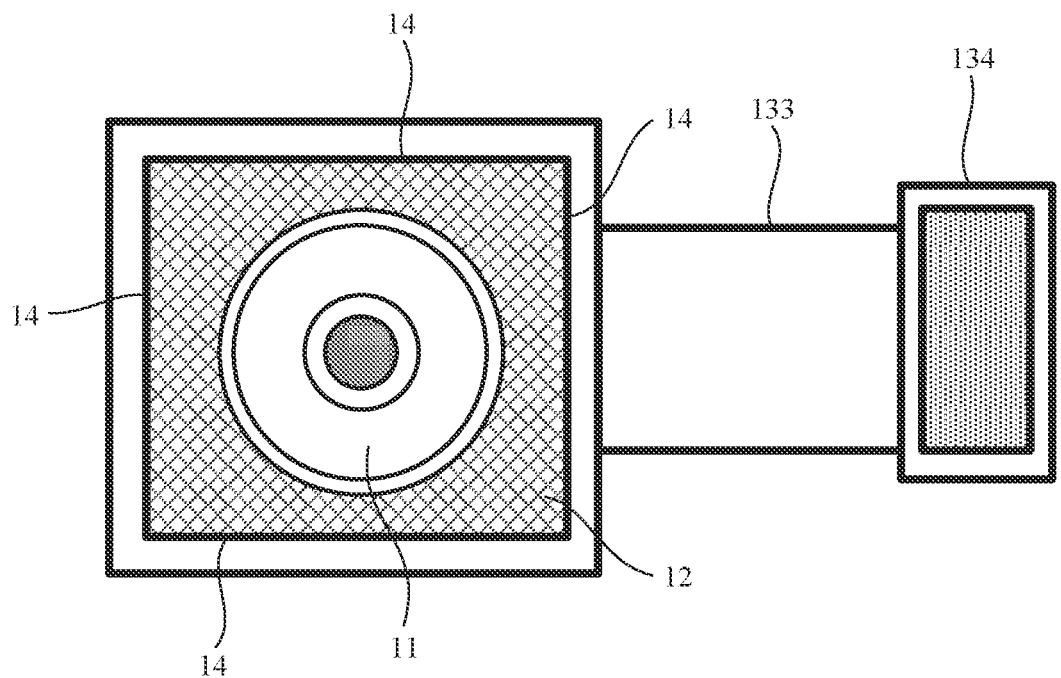
FIG. 15b is a schematic top view of another camera module according to an embodiment of this application.
Figure 15C:
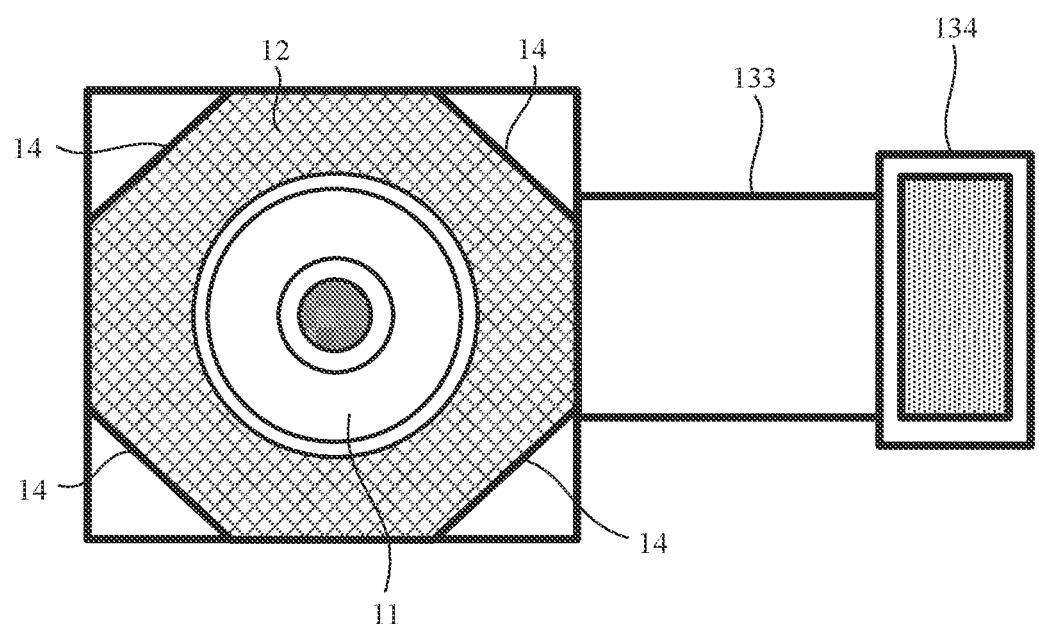
FIG. 15c is a schematic top view of a third camera module according to an embodiment of this application.

FIG. 15a is a schematic top view of a camera module according to an embodiment of this application; FIG. 15b is a schematic top view of another camera module according to an embodiment of this application; and FIG. 15c is a schematic top view of a third camera module according to an embodiment of this application.

That the edge of the substrate 131 of the image sensor assembly 13 in FIG. 7b includes the first inner concave portion 141, the edge of the support frame 121 of the light filtering assembly 12 includes the second inner concave portion 142, and the edge of the second inner concave portion 142 and the edge of the first inner concave portion 141 are flush is used as an example. With reference to FIG. 6, in an example in which a plane shape of the dimming conversion assembly is a polygon, the inner concave portion 14 may be located on a side or a corner portion of the dimming conversion assembly, and a side of one side/a plurality of the sides of the dimming conversion assembly may integrally contract to form the inner concave portion 14, or a local area of a side of one side/a plurality of the dimming conversion assembly contracts to form the inner concave portion 14, or one or more corner portions of the dimming conversion assembly contract to form the inner concave portion 14.

With reference to FIG. 5, the reinforcing portion 212 that extends inward from the inner edge of the opening 211 on the support plate 21 corresponds to the inner concave portion 14 of the dimming conversion assembly, and the reinforcing portion 212 extends into the avoidance space formed between the edge of the inner concave portion 14 and the edge of the lens assembly 11. Therefore, a shape and a size of the opening 211 with the reinforcing portion 212 matches a shape and a size of the dimming conversion assembly that includes the inner concave portion 14.

In an example in which the inner concave portion 14 extends along a side of the dimming conversion assembly, the inner concave portion 14 is disposed on at least one side of the dimming conversion assembly, and a reinforcing portion 212 is formed on a side that is of an inner edge of the opening 211 on the support plate 21 and that corresponds to the inner concave portion 14 of the dimming conversion assembly. Using one side of the dimming conversion assembly as an example, the inner concave portion 14 may extend to a whole area covering the side. In this way, the reinforcing portion 212 on the inner edge of the opening 211 may correspondingly cover the whole side of the side of the opening 211. This can increase a coverage area of the reinforcing portion 212, reduce an opening area of the opening 211, and improve structural strength of the support plate 21.

Referring to FIG. 15a, in a specific implementation, an inner concave portion 14 may be disposed on two opposite sides of the dimming conversion assembly, and the side walls of the two opposite sides of the dimming conversion assembly integrally contract in the lens assembly 11. Correspondingly, two inner edges corresponding to two side walls of the opening 211 and the inner concave portion 14 extend inward to form the reinforcing portion 212.

Referring to FIG. 15b, in another specific implementation, an inner concave portion 14 may be disposed on each circumferential side of the dimming conversion assembly, a circumferential edge of the dimming conversion assembly integrally contracts in the lens assembly 11, a concave and convex portion forms a ring-shaped structure, and a ring-shaped avoidance space is formed between an edge of the concave and convex portion and an edge of the lens assembly 11. Correspondingly, an inner edge of the opening 211 integrally extends inward, and a circumferential circle of the inner edge of the opening 211 forms a reinforcing portion 212.

In another implementation, the inner concave portion 14 may alternatively be disposed corresponding to a corner portion of the dimming conversion assembly. In an example in which a plane shape of the dimming conversion assembly is a rectangle, at least one corner portion of the four corner portions of the dimming conversion assembly forms an inner concave portion 14. For example, referring to FIG. 15c, each of four corner portions of a dimming conversion assembly may form an inner concave portions 14, and the inner concave portions 14 of the four corner portions may be formed, for example, by removing material from a part of an area of each corner portion of the substrate 131 and the support frame 121.

Corresponding to the inner concave portion 14 disposed at the corner portion of the dimming conversion assembly, a reinforcing portion 212 is formed at the corner portion of an inner edge of the opening 211 on the support plate 21. The reinforcing portion 212 extending from a corner portion of the opening 211 reduces an area of the opening 211, increases a coverage area of the support plate 21, and enhances structural strength of the support plate 21.

In the descriptions of embodiments of this application, it should be noted that unless otherwise specified and defined explicitly, the terms "mount", "connected to" and "connect" should be understood in a broad sense, and for example, may be a fixed connection or an indirect connection by using an intermediate medium, or may be internal communication between two elements or an interaction relationship between two elements. A person of ordinary skill in the art can understand specific meanings of the foregoing terms in embodiments of this application based on a specific situation.

In the specification of embodiments, claims, and accompanying drawings of this application, the terms "first", "second", "third", "fourth", and the like (if existent) are intended to distinguish between similar objects but do not necessarily indicate a specific order or sequence.

What is claimed is:

1. An electronic device, comprising:
a middle frame with a frame portion and a support plate connected to the frame portion, wherein an opening is disposed on the support plate; and
a camera module, wherein the camera module is mounted on the middle frame and corresponds to the opening;
wherein the camera module comprises a lens assembly, a dimming conversion assembly, and a protective cover, the dimming conversion assembly is disposed on an out-light side of the lens assembly, the protective cover wraps the dimming conversion assembly and the lens assembly, and the protective cover extends into the opening;
wherein an edge of the dimming conversion assembly comprises an inner concave portion, the inner concave portion is located on a side that is of the dimming conversion assembly and that is away from the lens assembly, and the inner concave portion occupies at least a part of the thickness of the dimming conversion assembly;

wherein along the circumferential direction of the lens assembly, the protective cover comprises a recessed portion, and the recessed portion is located corresponding to the inner concave portion; and wherein an inner edge of the opening comprises a reinforcing portion, and the reinforcing portion extends into the recessed portion.

2. The electronic device of claim 1, wherein the inner concave portion is located on a part of at least one side of the dimming conversion assembly.

3. The electronic device of claim 2, wherein the inner concave portion is located on at least one side of the dimming conversion assembly.

4. The electronic device of claim 3, wherein the inner concave portion covers is located on at least two opposite sides of the dimming conversion assembly.

5. The electronic device of claim 2, wherein the inner concave portion is a ring-shaped structure disposed along a circumferential edge of the dimming conversion assembly.

6. The electronic device of claim 1, wherein the inner concave portion is disposed at least one corner portion of the dimming conversion assembly.

7. The electronic device of claim 1, wherein the protective cover wraps whole of the dimming conversion assembly and side walls of the lens assembly, and the protective cover is connected to the middle frame.

8. The electronic device of claim 1, wherein the recessed portion is disposed around an outer side of the inner concave portion.

9. The electronic device of claim 1, wherein the lens assembly comprises a lens barrel and a plurality of lenses disposed in the lens barrel, and the dimming conversion assembly is connected to the lens barrel.

10. The electronic device of claim 1, wherein the lens assembly comprises a lens and a drive apparatus, the drive apparatus comprises a housing, the lens is movably disposed in the housing, and the dimming conversion assembly is connected to the housing.

11. The electronic device of claim 1, wherein the dimming conversion assembly comprises an image sensor assembly, the image sensor assembly is disposed on the out-light side of the lens assembly.

12. The electronic device of claim 11, wherein at least a part of the image sensor assembly extends into the opening, along the circumferential direction of the lens assembly, and at least a part of a circumferential area of an edge of the image sensor assembly comprises the inner concave portion.

13. The electronic device of claim 11, wherein the image sensor assembly comprises a substrate, an image sensor and a flexible printed circuit; and wherein one end of the flexible printed circuit is connected to the substrate, and the other end of the flexible printed circuit is connected to a mainboard of the electronic device.

14. The electronic device of claim 13, wherein along the circumferential direction of the lens assembly, the flexible printed circuit extends from a side that is of the lens assembly and protrudes from a side of the lens assembly.

15. The electronic device of claim 11, wherein the dimming conversion assembly comprises a light filtering assembly, and the light filtering assembly is disposed between the lens assembly and the image sensor assembly.

16. The electronic device of claims 15, wherein both the image sensor assembly and the light filtering assembly extends into the opening, and the inner concave portion is disposed at least on the image sensor assembly.

17. The electronic device of claim 16, wherein an edge of the light filtering assembly is flush with the edge of the lens assembly, and at least a part of a circumferential area of an edge of the image sensor assembly comprises the inner concave portion; and wherein the reinforcing portion comprises a step portion connected to the inner edge of the opening, and in a thickness direction of the support plate, and the step portion is located on a part that is of the support plate and that is away from the lens assembly.

18. The electronic device of claim 16, wherein at least a part of a circumferential area of an edge of the image sensor assembly comprises a first inner concave portion, at least a part of a circumferential area of an edge of the light filtering assembly comprises a second inner concave portion, the second inner concave portion corresponds to the first inner concave portion, and the first inner concave portion and the second inner concave portion jointly constitute the inner concave portion; and wherein the reinforcing portion extends into the first inner concave portion and the second inner concave portion.

19. The electronic device of claim 18, wherein an orthographic projection of the image sensor assembly on the light filtering assembly completely covers the light filtering assembly, and surfaces on two sides of the reinforcing portion are separately flush with surfaces on two sides of the support plate.

20. The electronic device of claim 18, wherein the edge of the first inner concave portion is located on an inner side of the edge of the second inner concave portion, the reinforcing portion comprises a first reinforcing portion and a second reinforcing portion, the first reinforcing portion extends into the first inner concave portion and is located on a part that is of the support plate and that is away from the lens assembly, and the second reinforcing portion extends into the second inner concave portion and is located on a part that is of the support plate and that is close to the lens assembly; and wherein an extension length of the first reinforcing portion is greater than an extension length of the second reinforcing portion, and the first reinforcing portion comprises a step surface facing the light filtering assembly.

* * * * *